(12) United States Patent
Okada

(10) Patent No.: US 9,032,538 B2
(45) Date of Patent: May 12, 2015

(54) RELAY APPARATUS, PROGRAM OF RELAY APPARATUS AND TRANSMITTING APPARATUS

(75) Inventor: Hiroki Okada, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 275 days.

(21) Appl. No.: 13/473,786

(22) Filed: May 17, 2012

(65) Prior Publication Data

US 2013/0111578 A1    May 2, 2013

(30) Foreign Application Priority Data

Oct. 31, 2011   (JP) .................. 2011-238324

(51) Int. Cl.
*G06F 7/04* (2006.01)
*G06F 21/00* (2013.01)
*H04N 21/4363* (2011.01)
*H04N 21/4405* (2011.01)

(52) U.S. Cl.
CPC .......... *G06F 21/00* (2013.01); *H04N 21/43635* (2013.01); *H04N 21/4405* (2013.01)

(58) Field of Classification Search
CPC .... G09G 2370/12; H04N 5/775; G06F 21/00; G06F 21/445; G06F 21/606; G06F 21/64; G06F 21/82; G11B 20/00086; G11B 20/00463; H04L 63/08; H04L 9/32

USPC ........................................... 726/26
See application file for complete search history.

(56) References Cited

U.S. PATENT DOCUMENTS

| | | | |
|---|---|---|---|
| 7,979,910 B2 * | 7/2011 | Mantani | 726/26 |
| 2008/0270635 A1 * | 10/2008 | Nakahama | 710/8 |
| 2009/0185682 A1 * | 7/2009 | Kellerman et al. | 380/201 |
| 2011/0013772 A1 * | 1/2011 | Roethig et al. | 380/200 |
| 2011/0113442 A1 * | 5/2011 | Kikkawa | 725/25 |

FOREIGN PATENT DOCUMENTS

JP    2006-246300    9/2006

* cited by examiner

*Primary Examiner* — Nirav B Patel
(74) *Attorney, Agent, or Firm* — Renner, Otto, Boisselle & Sklar, LLP

(57) ABSTRACT

A relay apparatus of a video and audio transmitting/receiving system delays a time before transmitting an authentication start instruction after an authentication start video signal being transmitted to a receiving apparatus. Accordingly, a problem that the receiving apparatus receives the authentication start instruction from the relay apparatus before locking the authentication start video signal and cannot perform authentication processing normally, leading to a failure in authentication. A correction time is decided based on a resolution of the authentication start video signal transmitted from the receiving apparatus and a combination of receiving apparatuses and transmitting apparatuses connected to the relay apparatus.

6 Claims, 14 Drawing Sheets

FIG.3

|  | EDID INFORMATION |  |  |
|---|---|---|---|
| MANUFACTURER NAME | | | COMPANY A |
| MODEL NAME | | | M MODEL |
| Power Management | | | ... |
| ... | | | ... |
| DDC/CI | | | Supported |
| STANDARD RESOLUTION | 0 | 480p | Supported |
| | 1 | 480i | Supported |
| | 2 | 720i | Supported |
| | 3 | ... | |
| | 4 | 1080i | Supported |
| | 5 | 1080p | Supported |
| | 6 | ... | |

RESOLUTION LIST (rows 0–6)

| Sink | Source | Td1 | Resolution | Td2+offset | Offset2 | Offset3 |
|---|---|---|---|---|---|---|
| Monitor1 | Player1 | 40ms | 480i | 20ms | 0ms | 0ms |
| | | | 480p | 10ms | 0ms | 0ms |
| | | | 1080i | 100ms | 30ms | 0ms |
| | | | 1080p | 100ms | 100ms | 30ms |
| | Player2 | 80ms | 480p | 0ms | 0ms | 0ms |
| | | | 1080p | 30ms | 0ms | 0ms |
| Monitor2 | Player1 | 60ms | 480i | 25ms | 0ms | 0ms |
| | | | 480p | 15ms | 0ms | 0ms |
| | | | 1080i | 100ms | 35ms | 0ms |
| | | | 1080p | 100ms | 100ms | 35ms |
| | Player2 | 50ms | 480p | 0ms | 0ms | 0ms |
| | | | 1080p | 20ms | 0ms | 0ms |

RELAY APPARATUS, PROGRAM OF RELAY APPARATUS AND TRANSMITTING APPARATUS

BACKGROUND OF THE INVENTION

1. Field of the Invention

The present invention relates to authentication processing of a relay apparatus, a transmitting apparatus, and a receiving apparatus.

2. Description of the Related Art

In recent years, a form in which a transmitting apparatus (hereinafter, referred to as a source device) such as a DVD player and a Blu-ray (registered trademark, hereinafter, referred to as Blu-ray) and a receiving apparatus (hereinafter, referred to as a sink device) such as a TV set are connected via a relay device (hereinafter, referred to as a repeater) such as an AV amplifier by using an HDMI (High-Definition Multimedia Interface) cable is in widespread use. By using the HDMI cable, video and audio data from a source device can be transmitted and received in digital format in high image quality and sound quality. Also, device authentication and content protection specified by the HDCP (High-bandwidth Digital Content Protection) standard are used as functions to protect copyrights of content transmitted from a source device.

By using the HDCP standard, content data between a source device and a repeater and between the repeater and a sink device can be encrypted. According to the HDCP standard, the source device and the repeater, and the repeater and the sink device each perform HDCP authentication by using an authentication protocol. In the HDCP authentication, first authentication, second authentication, and third authentication are performed. If, as a result of the HDCP authentication, the repeater and the sink device are not determined to be invalid devices, the repeater and the sink device can decrypt content encrypted by the source device. Device authentication in the HDCP standard is performed by using a DDC (Display Data Channel) communication line.

Incidentally, a source device and a repeater may not be able to complete HDCP authentication normally even if the timing of transmitting/receiving a signal specified in an authentication sequence of the HDCP standard is met. If, for example, the repeater transmits a TMDS (Transition Minimized Differential Signaling) signal to a sink device and then, immediately thereafter transmits an HDCP authentication start signal to the sink device, the sink device receives the HDCP authentication start signal before locking the TMDS signal and so may not be able to start HDCP authentication processing normally. Locking a TMDS signal means detecting the TMDS signal and analyzing the resolution and the like of the TMDS signal. When starting HDCP authentication, some source devices switch and transmit TMDS signals in different resolutions to the repeater in a short time. Accordingly, the repeater transmits TMDS signals received from the source device to the sink device and thus, TMDS signals in different resolutions are transmitted from the repeater to the sink device a plurality of times in a short time. As a result, the sink device cannot lock TMDS signals normally and cannot perform HDCP authentication normally. Further, the repeater transmits an instruction of HDCP first authentication to the sink device and then requests a key to determine whether the HDCP first authentication is completed normally, but if the interval between the start instruction of the HDCP first authentication and the instruction of key request is not appropriate, the verification of the key may fail. Further, if the time between verification processing of the key and the start of encryption of the TMDS signal is not appropriate, the repeater may fail to encrypt the TMDS signal.

SUMMARY OF THE INVENTION

The present invention is made to solve the above conventional problems and an object thereof is to prevent a failure in HDCP authentication by correcting the timing when a repeater performs the HDCP authentication with a sink device.

A relay apparatus of the present invention is connectable to a transmitting apparatus that transmits video and audio signals and a receiving apparatus that receives the video and audio signals. The relay apparatus comprises: an authentication video signal receiving unit configured to receive an authentication start video signal from the transmitting apparatus; a correction value decision unit configured to decide a correction value to correct timing for the relay apparatus to transmit the authentication start video signal or an authentication request to the receiving apparatus by determining whether authentication processing is successful while changing the correction value; and a correction unit configured to correct the timing to transmit the authentication start video signal or the authentication request to the receiving apparatus based on the correction value.

In authentication processing with a receiving apparatus, a relay apparatus may fail in authentication processing because the timing to transmit an authentication start video signal to the receiving apparatus or the timing to transmit an authentication start instruction to the receiving apparatus is not appropriate. The relay apparatus changes a correction value to correct the timing of authentication processing to decide the correction value when authentication is successful. Because the timing of the authentication start video signal or the authentication start instruction transmitted to the receiving apparatus is corrected based on the correction value, the relay apparatus can prevent a failure of the authentication processing.

The relay apparatus further comprises: an authentication video signal transmitting unit configured to transmit the authentication start video signal to the receiving apparatus when the authentication start video signal is received from the transmitting apparatus; an authentication instruction receiving unit configured to receive an authentication start instruction from the transmitting apparatus; and an authentication instruction transmitting unit configured to transmit the authentication start instruction to the receiving apparatus when the authentication start instruction is received from the transmitting apparatus. The correction value decision unit includes: a determination unit configured to transmit the authentication start instruction to the receiving apparatus by delaying for a first correction time after the authentication start video signal being transmitted to the receiving apparatus by the relay apparatus and to determine whether the relay apparatus has successfully performed the authentication processing with the receiving apparatus; a re-authentication unit configured to perform the authentication processing again by the first correction time being changed by the relay apparatus if the authentication processing is determined to be unsuccessful; and a unit configured to store the first correction time as the correction value if the authentication processing is determined to be successful. The correction unit corrects a time before the authentication start instruction is transmitted to the receiving apparatus after the authentication start video signal being transmitted to the receiving apparatus by the relay apparatus based on the first correction time decided by the correction value decision unit.

A relay apparatus transmits an instruction to start authentication after an authentication start video signal being transmitted to a receiving apparatus in authentication processing, but the authentication processing may fail because the transmission interval between the authentication start video signal and the authentication start instruction is too short and the receiving apparatus cannot start the authentication processing normally. The relay apparatus performs the authentication processing by changing a time between the transmission of the authentication start video signal to the receiving apparatus and the transmission of the instruction to start the authentication. The relay apparatus decides the time when the authentication processing is successful as a correction value. Because the relay apparatus transmits the instruction to start the authentication by causing a time delay based on the correction value after the authentication start video signal being transmitted to the receiving apparatus, the authentication processing can be prevented from failing.

The relay apparatus further comprises: an authentication instruction receiving unit configured to receive an authentication start instruction transmitted from the transmitting apparatus; an authentication instruction transmitting unit configured to transmit the authentication start instruction to the receiving apparatus when the authentication start instruction is received from the transmitting apparatus; a verification data receiving unit configured to request and receive verification data for determining whether the authentication processing is performed normally from the receiving apparatus; and a verification unit configured to verify verification data generated by the relay apparatus against the verification data received from the receiving apparatus. The correction value decision unit includes; a determination unit configured to request and acquire the verification data by delaying for a second correction time after the authentication start instruction being transmitted to the receiving apparatus by the relay apparatus and to determine whether the relay apparatus has successfully performed the authentication processing with the receiving apparatus; a re-authentication unit configured to perform the authentication processing again by the second correction time being changed by the relay apparatus if the authentication processing is determined to be unsuccessful; and a unit configured to store the second correction time as the correction value if the authentication processing is determined to be successful. The correction unit corrects a time before the verification data is requested by the relay apparatus from the receiving apparatus after the authentication start instruction being transmitted to the receiving apparatus by the relay apparatus based on the second correction time decided by the correction value decision unit.

A relay apparatus requests and acquires verification data from a receiving apparatus after the receiving apparatus being instructed to start authentication in authentication processing. If a time after the receiving apparatus being instructed to start the authentication by the relay apparatus until verification data is requested to the receiving apparatus is not appropriate, the relay apparatus fails in verification processing of verification data. The relay apparatus performs the authentication processing by changing the time between the transmission of the authentication start instruction to the receiving apparatus and the request and acquisition of the verification data from the receiving apparatus. The relay apparatus decides the time when the authentication processing is successful as a correction value. Because the relay apparatus performs the acquisition of the verification data by causing a time delay based on the correction value after the authentication start instruction being transmitted to the receiving apparatus, the authentication processing can be prevented from failing.

The relay apparatus further comprises: a start time storage unit configured to store a start time, which is a time when the authentication start video signal is received from the transmitting apparatus for the first time; an authentication video signal transmitting unit configured to transmit the authentication start video signal to the receiving apparatus; an authentication instruction receiving unit configured to receive an authentication start instruction transmitted from the transmitting apparatus; and a unit configured to store the received authentication start video signal when the authentication start video signal is received by the relay apparatus from the transmitting apparatus. The correction value decision unit includes; a latest time storage unit configured to store a time when the authentication start video signal is received as a latest time if the authentication start video signal is received from the transmitting apparatus before the authentication start instruction is received by the relay apparatus from the transmitting apparatus; and a unit configured to store a difference between the latest time and the start time as a third correction time when the authentication start instruction is received by the relay apparatus from the transmitting apparatus. The correction unit compares the third correction time decided by the correction value decision unit and an elapsed time from the start time and if the elapsed time is determined to be longer than the third correction time, the authentication video signal transmitting unit transmits the stored authentication start video signal to the receiving apparatus.

A transmitting apparatus transmits an authentication start video signal to a relay apparatus before transmitting an authentication start instruction to the relay apparatus. The relay apparatus transmits the authentication start video signal to the receiving apparatus, but if authentication start video signals of different resolutions are transmitted to the receiving apparatus in a short interval, the receiving apparatus cannot process the authentication start video signals normally. As a result, the receiving apparatus cannot start authentication processing normally. The relay apparatus stores a difference between the time when the transmitting apparatus transmits an authentication start video signal for the first time and the time when the authentication start video signal is transmitted immediately before the authentication start instruction being transmitted as a correction value. The relay apparatus determines whether the time indicated by the correction time has passed after the transmitting apparatus starts to transmit the authentication start video signal and transmits the authentication start video signal to the receiving apparatus when the correction value is exceeded and therefore, the receiving apparatus does not receive the authentication start video signal a plurality of times. As a result, the receiving apparatus can start the authentication processing normally.

The relay apparatus further comprises: a select apparatus decision unit configured to decide the receiving apparatus and the transmitting apparatus selected in the relay apparatus;

a resolution acquisition unit configured to acquire a resolution of the authentication start video signal; a correction value decision unit for each resolution configured to perform processing to decide the correction value for each of the resolutions recorded in a resolution list; and a unit configured to perform processing to determine whether the authentication processing is successful while changing the correction value for a combination of one or a plurality of the receiving apparatuses and the transmitting apparatuses connected to the relay apparatus. The correction value is decided based on the resolution acquired by the resolution acquisition unit, information about the receiving apparatus selected in the relay apparatus. Information about the transmitting apparatus selected in the relay apparatus and timing to transmit the authentication start video signal or the authentication request to the receiving apparatus is corrected based on the correction value.

A relay apparatus performs processing to decide a correction value for each resolution that can be output by the relay apparatus. Further, the relay apparatus performs processing to decide the correction value for each combination of receiving apparatuses and transmitting apparatuses connected to the relay apparatus. As a result, the relay apparatus can acquire the correction value for each of the resolution of an authentication start video signal transmitted from the receiving apparatus and the combination of receiving apparatuses and transmitting apparatuses selected in the relay apparatus and therefore, the timing of authentication processing can be corrected according to the correction value.

A transmitting apparatus of the present invention is connectable to a receiving apparatus that receives video and audio signals. The transmitting apparatus comprises: an authentication video signal transmitting unit configured to transmit an authentication start video signal to the receiving apparatus; a correction value decision unit configured to decide a correction value that corrects timing to transmit the authentication start video signal or an authentication instruction to the receiving apparatus; and a correction unit configured to correct the timing to transmit the authentication start video signal or the authentication instruction to the receiving apparatus based on the correction value.

A transmitting apparatus fails in authentication processing with a receiving apparatus due to inappropriate timing to transmit a signal to the receiving apparatus or inappropriate timing to transmit an instruction to the receiving apparatus. The transmitting apparatus changes a correction value to correct the timing of authentication processing and decides the correction value when authentication is successful. Because the timing of an authentication start video signal or an authentication start instruction transmitted to the receiving apparatus is corrected based on the correction value, the transmitting apparatus can prevent a failure of the authentication processing.

BRIEF DESCRIPTION OF THE DRAWINGS

FIG. 3 is an EDID table held by a repeater;

DETAILED DESCRIPTION OF THE PREFERRED EMBODIMENTS

Figure 1:
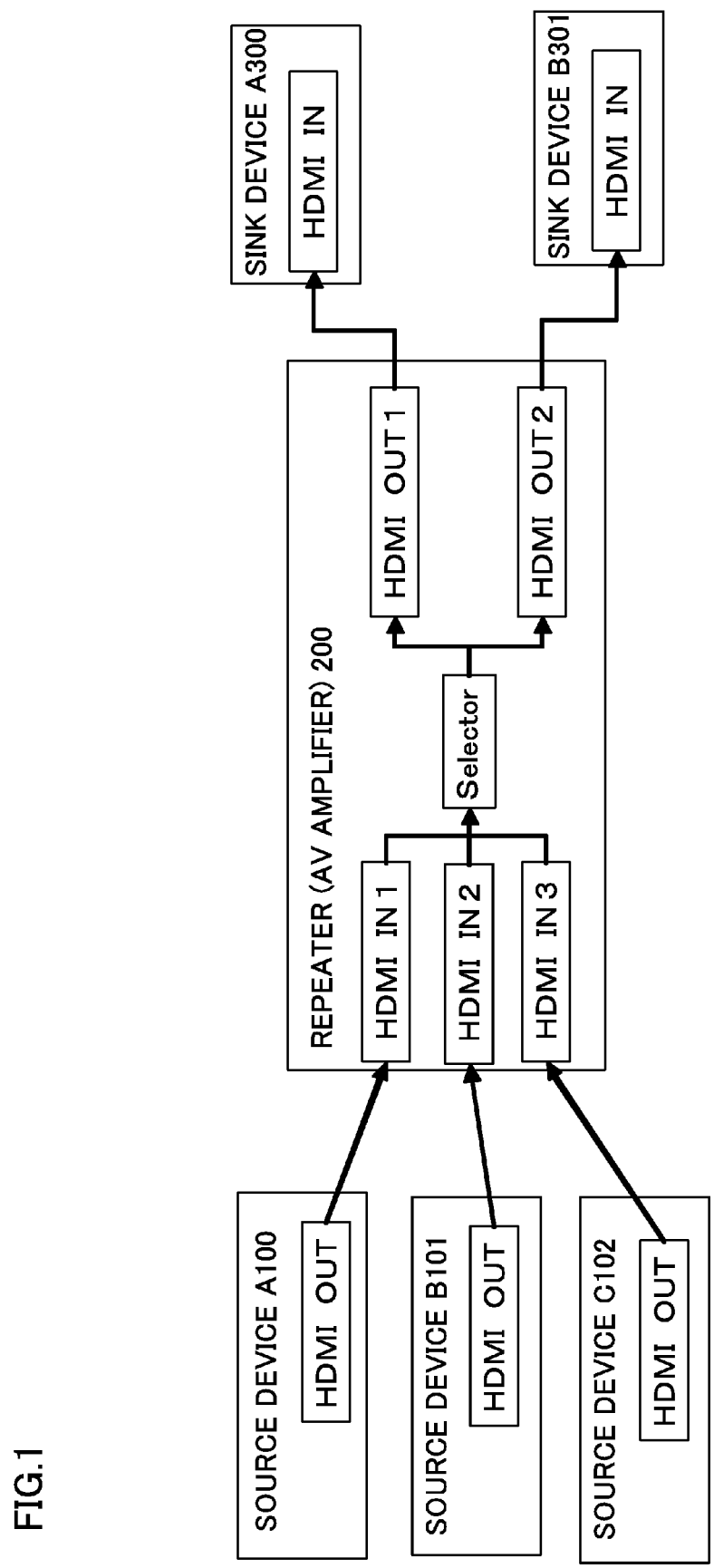
FIG. 1 is a conceptual diagram of device connection according to a preferred embodiment of the present invention.

The source device, repeater, and sink device according to a preferred embodiment of the present invention will concretely be described with reference to drawings, but the present invention is not limited to such an embodiment. FIG. 1 is a block diagram of a transmitting apparatus, a relay apparatus, and a receiving apparatus according to the preferred embodiment of the present invention.

A source device A100, a source device B101, and a source device C102 as source devices are connected to a repeater 200 as a relay device. If there is no particular need to distinguish, the source devices A100, B101, C102 will simply be called a source device 100 below. The source device 100 is, for example, a DVD player, Blu-ray player, or HDD player. The repeater 200 is, for example, an AV amplifier. The source device 100 and the repeater 200 are connected by an HDMI cable. The repeater 200 includes a plurality of HDMI input ports and the source device 100 is connected to the respective port.

A signal related to video of a signal input into the repeater 200 is output to a sink device A300 or a sink device B301 from HDMI OUT. If there is no particular need to distinguish, the sink devices A300, B301 will simply be called a sink device 300. The sink device 300 is a display apparatus and is, for example, a TV, PC monitor or the like. The repeater 200 and the sink device 300 are connected by an HDMI cable. The repeater 200 includes one or a plurality of HDMI output ports and the sink device 300 is connected to the respective output port.

The user operates an input selector of the repeater 200 to select one of HDMI IN 1 to 3 as an input port. Further, the user operates an output selector of the repeater 200 to select one of HDMI OUT 1, 2. As a result, video data from the source device 100 connected to the selected HDMI IN is relayed by the repeater 200 and output to the sink device 300 connected to the HDMI OUT selected in the repeater 200. Audio data from the source device 100 is converted into analog data and amplified by the repeater 200 before being output from a speaker connected to the repeater 200. If the repeater 200 is capable of processing two input signals or more simultaneously, the user can select a plurality of HDMI IN simultaneously. If the repeater 200 is capable of outputting two signals or more simultaneously, the user can select a plurality of HDMI OUT simultaneously.

Figure 2:
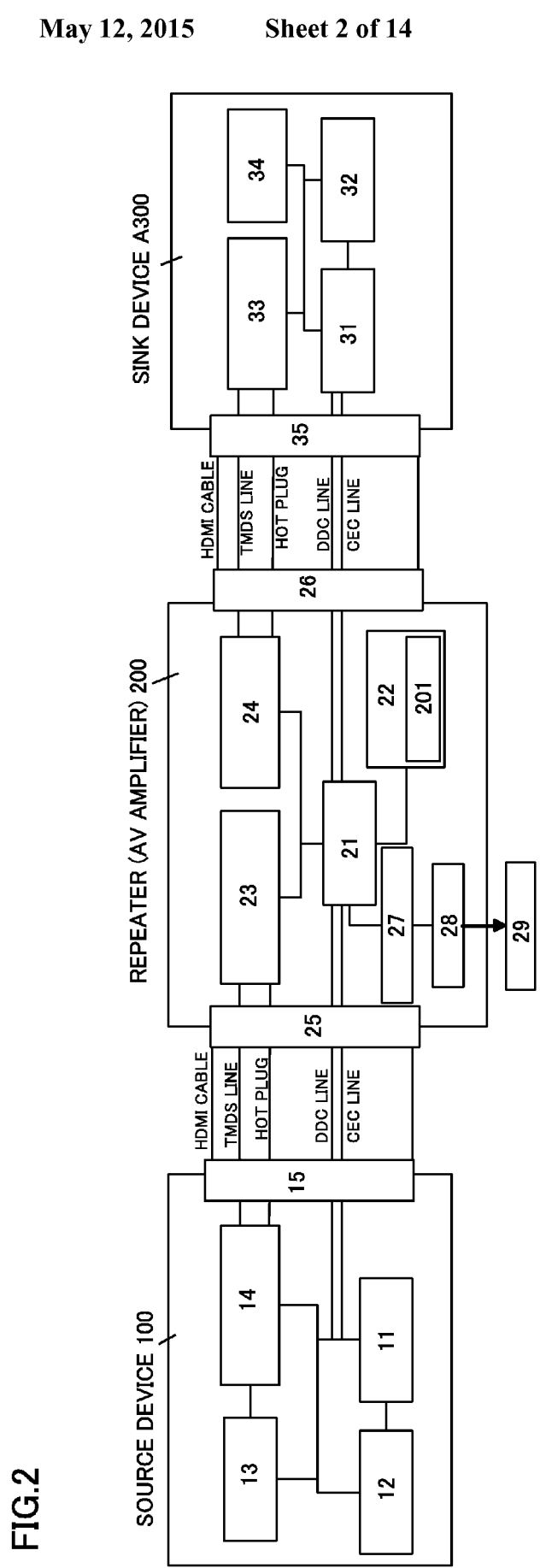
FIG. 2 is a block diagram according to the preferred embodiment of the present invention.

FIG. 2 is a block diagram of a video/audio communication system according to the preferred embodiment of the present invention. FIG. 2 shows a state in which one source device 200 and one sink device 300 are connected to the repeater 200.

The source device 100 includes a control unit 11, a memory 12, a reproducing unit 13, and an HDMI transmitting unit 14.

The control unit 11 controls the source device 100 as a whole by executing a program stored in the memory 12 and is, for example, a microcomputer or CPU. The memory 12 is used to hold setting content and the like of the source device 100 and is, for example, a ROM or RAM. The reproducing unit 13 is used to reproduce a disk or the like inserted into the source device 100 and is, for example, a DVD/Blu-ray reproducing unit or HDD reproducing unit. The reproducing unit 13 reproduces content of a DVD/Blu-ray disk or the like and video data and audio data of the reproduced content are output to the HDMI transmitting unit 14.

The HDMI transmitting unit 14 is connected to a connector unit 15, which converts video data and audio data input from the reproducing unit 13 into an HDMI standard signal (hereinafter, an HDMI signal) based on the control of the control unit 11. The HDMI transmitting unit 14 encrypts an HDMI signal to be transmitted based on the control of the control unit 11. The HDMI transmitting unit 14 also performs HDCP authentication by reading a verification key for HDCP authentication from the repeater 200 via a DDC line based on the control of the control unit 11.

The connector unit 15 of the source device 100 is connected to a connector unit 25 of the repeater 200 via an HDMI cable. The HDMI cable is constituted of a TMDS line that communicates an HDMI signal, a hot plugin that detects a hot plug, a DDC (Display Data Channel) line that communicates data such as EDID, and a CEC line that communicates a signal for linking devices. Though a plurality of TMDS lines is normally present, only one line is shown for simplicity's sake.

The repeater 200 includes a control unit 21, a memory 22, an HDMI receiving unit 23, an HDMI transmitting unit 24, a signal processing unit 27, and an amplification unit 28. The amplification unit 28 is connected to a speaker 29. The control unit 21 controls the repeater 200 as a whole by executing a program stored in the memory 22 and is, for example, a microcomputer or CPU. The memory 22 is used to hold setting content and the like of the repeater 200 and is, for example, a ROM or RAM. The memory 22 has a table 201. The table 201 will be described later. The signal processing unit 27 is a DSP or the like and an audio signal received by the HDMI receiving unit 23, on which processing such as a sound field correction is performed by the signal processing unit 27, is output from the speaker 29 via the amplification unit 28 constituted of a DAC, amplifier and the like. The HDMI receiving unit 23 receives, based on the control of the control unit 21, an HDMI signal transmitted from the HDMI transmitting unit 14 of the source device 100 and decrypts the HDMI signal encrypted based on HDCP. The HDMI receiving unit 23 also generates original video data from the received HDMI signal based on the control of the control unit 21 and transmits the video data to the HDMI transmitting unit 24. The HDMI receiving unit 23 also generates original audio data from the HDMI signal based on the control of the control unit 21 and transmits the audio data to the audio signal processing unit 27.

The HDMI transmitting unit 24 is connected to a connector unit 26, which converts video data and audio data input from the HDMI receiving unit 23 and decrypted into an HDMI signal based on the control of the control unit 21. The HDMI transmitting unit 24 also encrypts an HDMI signal to be transmitted based on the control of the control unit 21. The HDMI transmitting unit 24 also performs HDCP authentication by reading authentication information and a verification key for HDCP authentication from the sink device 300 via the DDC line based on the control of the control unit 21.

The sink device 300 includes a control unit 31, a memory 32, an HDMI receiving unit 33, and a display unit 34. The control unit 31 controls the sink device 300 as a whole by executing a program stored in the memory 32 and is, for example, a microcomputer or CPU. The memory 32 is used to hold setting content and the like of the sink device 300 and is, for example, a ROM or RAM. The HDMI receiving unit 33 is connected to a connector unit 35 and based on the control of the control unit 31, receives an HDMI signal transmitted from the repeater 200 and decrypts the HDMI signal encrypted based on HDCP. The HDMI receiving unit 33 also generates original video data from the received HDMI signal based on the control of the control unit 31 and transmits the video data to the display unit 34. The display unit 34 is a display apparatus and is, for example, a liquid crystal display or plasma display.

The control unit 21 of the repeater 200 configured as described above manages correction values to correct the time between the transmission of a TMDS signal to the sink device 300 and the transmission of a first authentication start instruction in HDCP authentication with the source device 100 and the sink device 300, the time between the start of HDCP first authentication with the sink device 300 by the repeater 200 and the acquisition of verification data to check the completion of the HDCP first authentication from the sink device 300, and the time between the completion of the HDCP first authentication and the start of encryption of a TMDS signal to be transmitted to the sink device 300. The control unit 21 of the repeater 200 also decides combinations of correction values with the resolution of a TMDS signal, the source device 100, and the sink device 300. Then, the control unit 21 of the repeater 200 uses these correction values for HDCP authentication to correct the transmission timing of a signal or instruction to be transmitted to the sink device 300.

[Embodiment to Connect the Source Device and the Sink Device Via the Repeater]

The operation of the present invention will be described below. First, FIG. 3 shows an EDID table stored in a memory by the repeater 200. In the EDID table, a list of resolutions that can be output to the sink device 300 by the repeater 200 is recorded. The EDID table in FIG. 3 shows that the repeater 200 supports resolutions such as 480p, 480i, 720i and the like.

Figure 4:
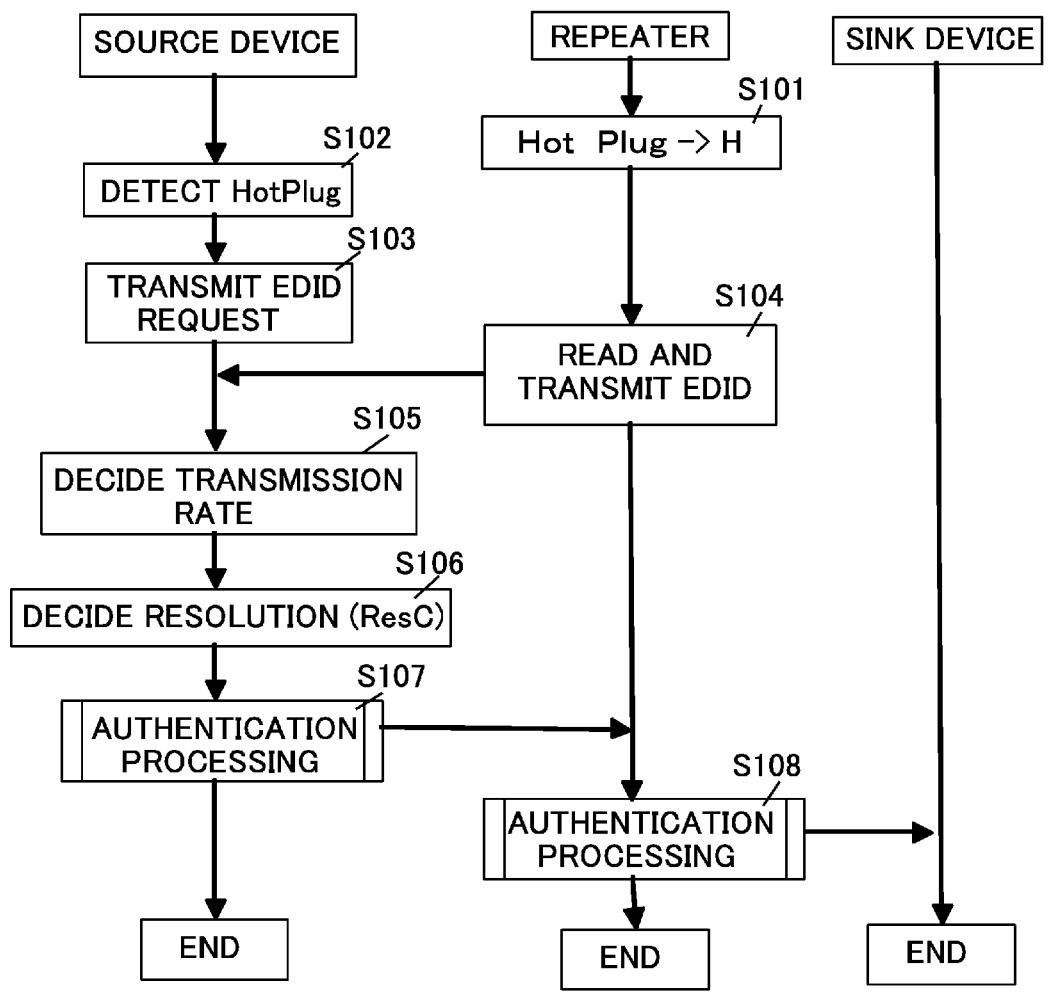
FIG. 4 is a sequence chart among a source device, the repeater, and a sink device.

FIG. 4 shows a sequence chart performed by each control unit of the source device 100, the repeater 200, and the sink device 300 when HDCP authentication processing is started. The sequence is started when, for example, the source device 100, the repeater 200, and the sink device 300 are connected by an HDMI cable.

The control unit 21 of the repeater 200 sets HotPlug transmitted by the HDMI transmitting unit 24 to High (S101). The control unit 11 of the source device 100 detects the change of HotPlug (S102) and requests the transmission of EDID information from the repeater 200 (S103). The control unit 21 of the repeater 200 transmits the EDID information of the repeater 200 shown in FIG. 3 to the source device 100 via the DDC line (S104).

The control unit 11 of the source device 100 decides a transmission rate of an HDMI signal to be communicated to the repeater 200 via a TMDS line based on the EDID information (S105) and further decides the resolution of a video signal to be transmitted to the repeater 200 (S106). It is assumed here that ResC is decided as the resolution. Though omitted in the flow of FIG. 4, processing similar to S101 to S106 is performed also between the repeater 200 and the sink device 300.

Each of the source device 100, the repeater 200, and the sink device 300 starts HDCP authentication processing (S107 and S108).

Figure 5:
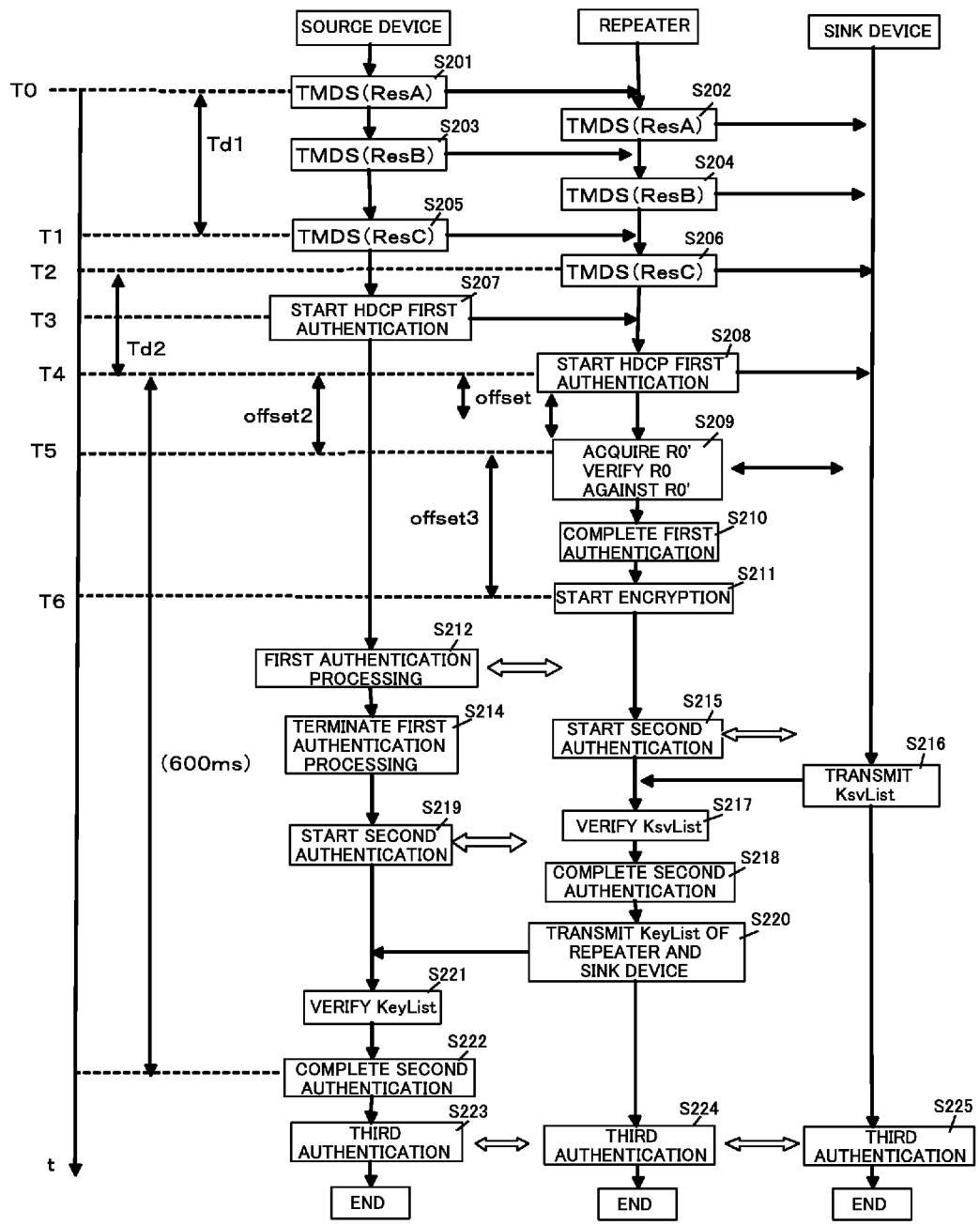
FIG. 5 is a sequence chart among the source device, the repeater, and the sink device.

The HDCP authentication processing in S107 and S108 will be described in detail below. FIG. 5 shows an HDCP authentication processing sequence among the source device 100, the repeater 200, and the sink device 300. FIG. 5 shows a time axis on the left side. The HDMI transmitting unit 14 of the source device 100 transmits a TMDS signal to the repeater 200 at t=T0 (S201). Here, t is the time and T0 is the time when the HDMI transmitting unit 14 of the source device 100 transmits the first TMDS signal to the repeater 200 in the HDCP authentication processing. T0 is the time relative to a certain time point. A certain time point is, for example, the time when HotPlug in S101 of FIG. 4 is set to High or the like, but is not limited to the above example. The time t is managed by the repeater 200. The HDMI transmitting unit 14 of the source device 100 transmits a TMDS signal to the repeater 200 as a video signal indicating the start of authentication in the HDCP authentication processing (S201). In S201, the HDMI transmitting unit 14 of the source device 100 transmits a TMDS signal of the resolution ResA. A TMDS signal of the resolution A will be denoted in the form of TMDS (ResA) below.

When the HDMI receiving unit 23 of the repeater 200 receives TMDS (ResA) from the source device 100, the HDMI transmitting unit 24 of the repeater 200 transmits TMDS (ResA) to the sink device 300 (S202).

The HDMI transmitting unit 14 of the source device 100 transmits TMDS (ResB) to the repeater 200 (S203) and the HDMI transmitting unit 24 of the repeater 200 transmits TMDS (ResB) to the sink device 300 (S204). Further, the HDMI transmitting unit 24 of the source device 100 transmits TMDS (ResC) to the repeater 200 (S205) and the HDMI transmitting unit 14 of the repeater 200 transmits TMDS (ResC) to the sink device 300 (S206). As described above, even if ResC is decided as the resolution to be transmitted by the processing in S106 of FIG. 4, the HDMI transmitting unit 14 of the source device 100 may transmit a TMDS signal of a resolution different from the resolution decided in S106 a plurality of times. Because TMDS signals of different resolutions are transmitted from the HDMI transmitting unit 24 of the repeater 200 to the sink device 300 in a short time, the HDMI receiving unit 33 of the sink device 300 cannot lock a TMDS signal normally, causing a problem of being unable to perform the subsequent HDCP authentication processing normally. This problem is denoted as Problem 1 below. Incidentally, it is impossible for the control unit 21 of the repeater 200 to know how many times a TMDS signal should be transmitted to the repeater 200 before the control unit 11 of the source device 100 instructs the start of HDCP first authentication.

The control unit 11 of the source device 100 transmits an instruction to start the HDCP first authentication to the repeater 200 at t=T3 via the DDC line (S207). T1 is the time when the HDMI receiving unit 23 of the repeater 200 receives the TMDS signal (processing in S205) immediately before the control unit 11 of the source device 100 transmits the instruction to start the HDCP first authentication to the repeater 200 and T2 is the time when the HDMI transmitting unit 24 of the repeater 200 transmits the TMDS signal. Td1 is a time interval between T1 and T0. That is, Td1 is a time interval in which the HDMI transmitting unit 14 of the source device 100 transmits TMDS signals to the repeater 200 before the control unit 11 of the source device 100 transmits the instruction to start the HDCP first authentication to the repeater 200.

The control unit 21 of the repeater 200 receives the instruction to start the HDCP first authentication from the control unit 11 of the source device 100 via the DDC line and transmits the instruction to start the HDCP first authentication to the sink device 300 as an authentication request (S208). Time T4 is the time when the control unit 21 of the repeater 200 instructs the sink device 300 to start the HDCP first authentication. In the HDCP authentication standard, the source device 100 needs to complete HDCP second authentication shown in S222 within 600 ms (milliseconds. hereinafter, denoted as ms) from T4, the time interval between T4 and T2 is Td2. That is, Td2 is a time interval between the transmission of the TMDS signal to the sink device 300 immediately before by the HDMI transmitting unit 24 of the repeater 200 and the instruction to start the HDCP first authentication by the control unit 21 of the repeater 200. Incidentally, if Td2 is short, the control unit 31 of the sink device 300 receives the instruction to start the HDCP first authentication from the control unit 21 of the repeater 200 in S208 before the HDMI receiving unit 33 of the sink device 300 locks the TMDS signal transmitted by the HDMI transmitting unit 24 of the repeater 200 in S206, causing a problem that the control unit 31 of the sink device 300 cannot start the HDCP first authentication normally. This problem is denoted as Problem 2 below.

The control unit 21 of the repeater 200 requests and acquires a session key R0' from the sink device 300 as an authentication request and determines whether R0' and a session key R0 generated by the control unit 21 of the repeater 200 are equal (S209). Time T5 is the time when the control unit 21 of the repeater 200 acquires R0' from the sink device 300. Incidentally, if the time interval between the transmission of the instruction to start the HDCP first authentication to the sink device 300 by the control unit 21 of the repeater 200 and the transmission of a request to acquire R0' to the sink device 300 by the control unit 21 of the repeater 200 is short, the control unit 33 of the sink device 300 cannot transmit the correct R0' to the repeater 200, causing a problem of failed verification processing of R0 by the repeater 200. This problem is denoted as Problem 3 below.

If the control unit 21 of the repeater 200 determines that R0 and R0' match, the HDCP first authentication is completed (S210). Then, the control unit 21 of the repeater 200 causes the HDMI transmitting unit 24 to encrypt a TMDS signal to be transmitted to the sink device 300 (S211). In S211 and thereafter, TMDS signals between the sink device 300 and the repeater 200 are all encrypted. The time when the control unit 21 of the repeater 200 starts encryption is T6. Incidentally, if the time interval between the verification of R0 and R0' by the control unit 21 of the repeater 200 in S209 and the start of encryption in S211 is short, a problem that the control unit 21 of the repeater 200 may fail in encryption processing is caused. This problem is denoted as Problem 4 below.

The control unit 11 of the source device 100 performs the HDCP first authentication with the repeater 200 (S212, S214). The HDCP first authentication performed by the source device 100 with the repeater 200 may be performed after the HDCP first authentication performed by the repeater 200 with the sink device 300 terminates or in parallel.

The control unit 21 of the repeater 200 starts the HDCP second authentication with the sink device 300 (S215). The HDCP second authentication is authentication needed when the connected device is a repeater. The control unit 31 of the sink device 300 transmits KsvList to the repeater 200 via the DDC line (S216).

The control unit 21 of the repeater 200 verifies KsvList generated by the control unit 21 of the repeater 200 against KsvList transmitted from the sink device 300 (S217) and if a matching verification result is obtained, the control unit 21 determines that the HDCP second authentication is successful and terminates the HDCP second authentication (S218).

The source device 100 starts the HDCP second authentication with the repeater 200 (S219). The control unit 21 of the repeater 200 transmits KsvList of the repeater 200 and the sink device 300 to the source device 100 via the DDC line (S220).

The control unit 11 of the source device 100 verifies KsvList of the source device 100 against KsvList received in S220 (S221) and if a matching verification result is obtained, the control unit 11 determines that the HDCP second authentication is successful and terminates the HDCP second authentication (S222).

Each control unit of the source device 100, the repeater 200, and the sink device 300 performs HDCP third authentication (S223, S224, S225) before terminating the HDCP authentication.

Figure 6A:
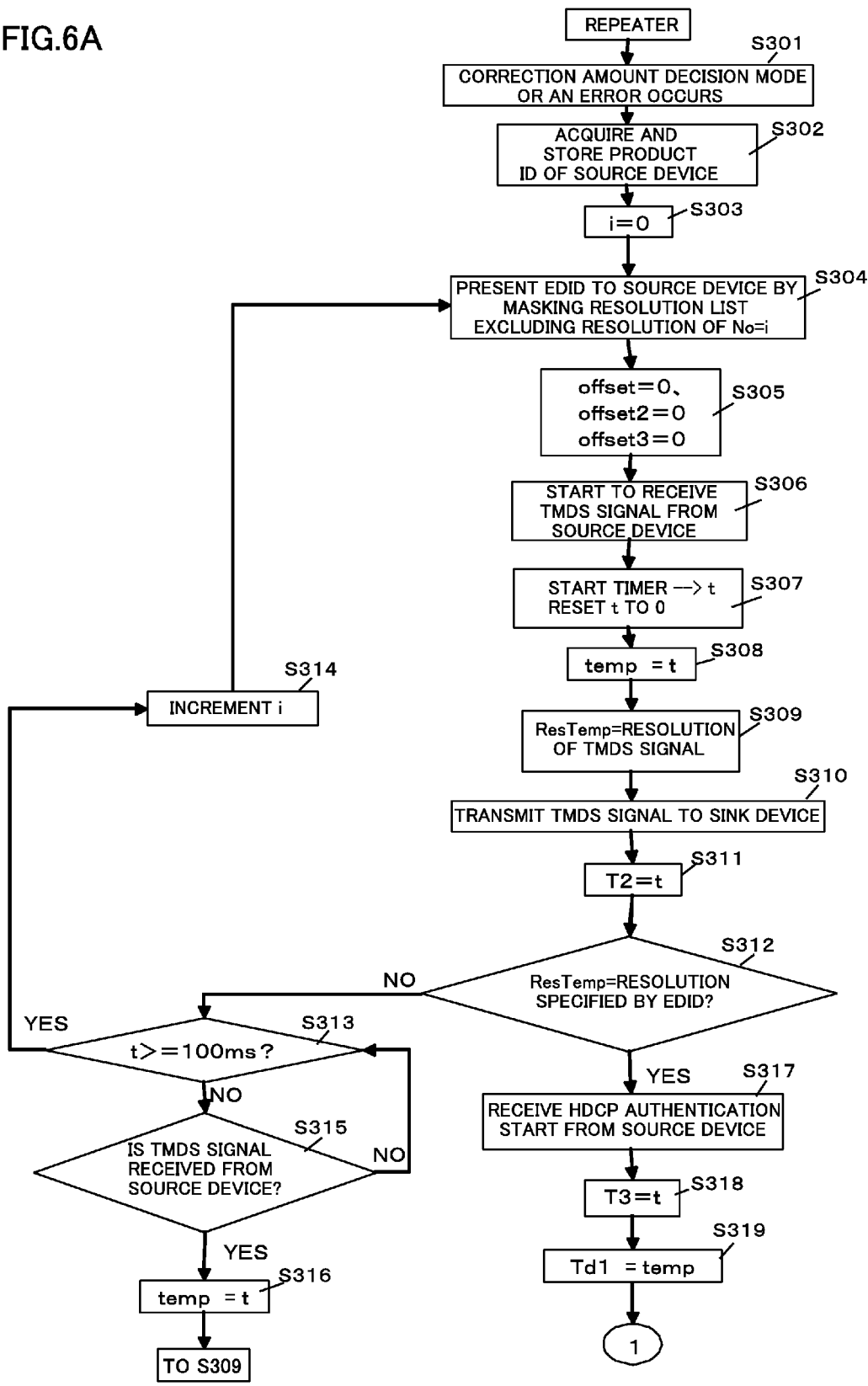
FIG. 6A is a flow chart of the repeater.
Figure 6B:
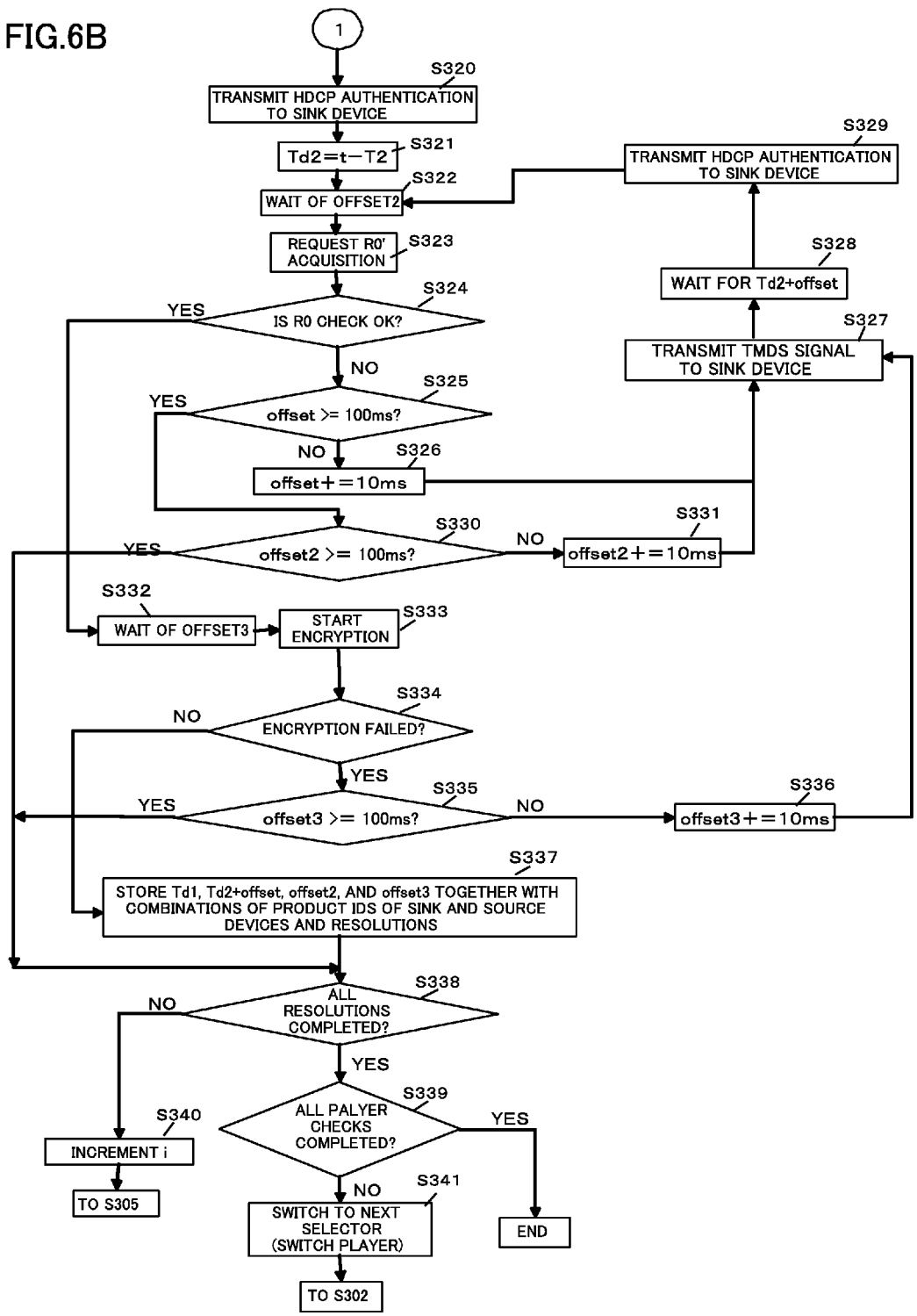
FIG. 6B is a flow chart of the repeater.

To solve the above Problems 1 to 4, correction values to correct the timing of signal transmission in the HDCP authentication sequence of FIG. 5 are decided. FIGS. 6A and 6B show flow charts of processing performed by the control unit 21 of the repeater 200 to decide correction amounts of the signal transmission timing. The times T1, T2, T3, Td1, Td2 in the flow charts of FIGS. 6A and 6B are associated with variables shown in FIG. 5.

If the mode (hereinafter, referred to as the correction amount decision mode) to decide correction amounts of the timing of the HDCP authentication sequence is selected by a user's operation or the HDCP authentication in FIG. 5 fails (S301), the control unit 21 of the repeater 200 acquires and stores the product ID of the source device 100 selected by the repeater 200 (S302). The product ID of the source device 100 is device information acquired from EDID or the like of the source device 100 and may be anything that can uniquely identify the source device 100. The user can start the correction amount decision mode by pressing a button or the like included in the repeater 200.

The control unit 21 sets a variable i to 0 (S303). The variable i is a variable to specify the resolution of the resolution list of EDID of FIG. 3.

The control unit 21 masks resolutions other than the resolution specified by the variable i of the resolution list of EDID in FIG. 3 to present the specified resolution to the source device 100 via the DDC line (S304). If, for example, i=0, the repeater 200 presents to the source device 100 that resolutions other than 480p are not supported. Accordingly, the resolution of TMDS signals transmitted from the HDMI transmitting unit 14 of the source device 100 to the repeater 200 will be 480p.

The control unit 21 initializes variables offset, offset2, and offset3 to 0 (S305). Offset is a variable used to correct the time between the transmission of a TMDS signal to the sink device 300 by the HDMI transmitting unit 24 of the repeater 200 and the transmission of an instruction to start the HDCP first authentication. Offset2 is a variable used to correct the time between the transmission of an instruction to start the HDCP first authentication to the sink device 300 by the control unit 21 and the acquisition of R0' from the sink device 300. Offset3 is a variable used to correct the time between the start of checking R0 by the control unit 21 and the start of encryption. Offset is a variable to solve the above Problem 2, offset2 is a variable to solve the above Problem 3, and offset3 is a variable to solve the above Problem 4. Incidentally, Problem 1 is solved by Td1 decided by the following flow chart.

The HDMI receiving unit 23 of the repeater 200 starts to receive a TMDS signal from the source device 100 (S306). When starting to receive a TMDS signal from the HDMI transmitting unit 14 of the source device 100, the HDMI receiving unit 23 of the repeater 200 starts to count a timer (S307). The timer records an elapsed time in a variable t. If counting of the timer is already started, the timer variable t is reset to 0. The control unit 21 stores the time t when the reception of the TMDS signal is started in a variable temp (S308). Further, the control unit 21 sets the resolution of the TMDS signal received in S306 to a variable ResTemp (S309).

The HDMI transmitting unit 24 of the repeater 200 transmits the TMDS signal to the sink device 300 (S310). Then, the control unit 21 stores the time t when the TMDS signal is transmitted to the sink device 300 in a variable T2 (S311).

The control unit 21 determines whether the resolution of ResTemp matches the resolution presented to the source device 100 in S304 (S312) and if both resolutions are determined not to match (NO in S312), the control unit 21 determines whether the time t is 100 ms or more (S313). If it is determined that the time t is less than 100 ms (NO in S313), the control unit 21 determines whether any TMDS signal has been received from the HDMI transmitting unit 14 of the source device 100 (S315). Because the HDMI transmitting unit 14 of the source device 100 may transmit TMDS signals of different resolutions a plurality of times before the control unit 11 of the source device 100 transmits an instruction to start the HDCP first authentication, the control unit 21 checks whether any TMDS signal is received by the processing in S315.

If it is determined that the HDMI receiving unit 23 has received a TMDS signal from the source device 100 (YES in S315), the control unit 21 updates the variable temp at the current time t (S316) to perform processing in S309 and thereafter. If it is determined that the HDMI receiving unit 23 has not received any TMDS signal from the source device 100 (NO in S315), the control unit 21 performs the processing in S313.

If it is determined that the time t is 100 ms or more (YES in S313), the control unit 21 determines that a signal of the resolution presented in S304 by the control unit 11 of the source device 100 cannot be transmitted and increments i (S314) to specify the next resolution in S304. The upper limit of S313 does not necessarily have to be 100 ms and may be larger than 100 ms or less than 100 ms.

If it is determined that ResTemp matches the resolution presented to the source device 100 in S304 (YES in S312), the control unit 21 receives an instruction to start the HDCP first authentication from the control unit 11 of the source device 100 via the DDC line (S317). The control unit 21 stores the time t at this point in a variable T3 (S318) and sets Td1 to the value of temp stored in S308 or S316 (S319). Td1 is decided by the above processing.

The control unit 21 transmits an instruction to start the HDCP first authentication to the sink device 300 via the DDC line (S320 in FIG. 6B). The control unit 21 stores a value obtained by subtracting T2 from the current time t as Td2 (S321). Then, the control unit 21 performs wait processing for the time specified by offset2 (S322). The wait processing is processing of waiting. Because offset2 is 0, the waiting time is 0.

The control unit 21 acquires R0' from the sink device 300 via the DDC line (S323) and determines whether R0 generated by the repeater 200 matches R0' (S324) and if R0 and R0' are determined not to match (NO in S324), the control unit 21 determines whether offset is 100 ms or more (S325). The control unit 21 limits the upper limit of offset to 100 ms. Because, as described above, it is necessary to limit the time between T4 and the end of the HDCP second authentication up to 600 ms, there is a possibility that the processing cannot be terminated within 600 ms if offset is prolonged too much. The upper limit does not necessarily have to be 100 ms. If it is determined that offset is less than 100 ms (NO in S325), the control unit 21 adds 10 ms to offset (S326).

The HDMI transmitting unit 24 of the repeater 200 transmits a TMDS signal to the sink device 300 (S327) and the control unit 21 performs wait processing for the time of Td2+offset (S328) before transmitting an instruction to start the HDCP first authentication to the sink device 300 (S329). That is, in S327 to S329, the control unit 21 performs HDCP first authentication processing with the sink device 300 again. The control unit 21 prolongs the time between the transmission of the TMDS signal to the sink device 300 and an instruction is issued to start the HDCP first authentication by 10 ms compared with the last time when performed again.

If it is determined that offset is 100 ms or more (YES in S325), the control unit 21 determines whether offset2 is 100 ms or more (S330). Because, as described above, it is necessary for the source device 100 to limit the time between T4 and the end of the HDCP second authentication up to 600 ms, offset2 is also limited to 100 ms. However, the upper limit does not necessarily have to be 100 ms.

If it is determined that offset2 is less than 100 ms (NO in S330), the control unit 21 adds 10 ms to offset2 (S331) and performs the processing of re-authentication in S327 and thereafter.

If it is determined that offset2 is 100 ms or more (YES in S330), the control unit 21 determines whether the processing in S305 and thereafter has been performed for all resolutions in the resolution list of FIG. 3 (S338).

If R0 and R0' are determined to match (YES in S324), the control unit 21 performs wait processing for the time of offset3 (S332). Because offset3 is 0, the waiting time is 0.

The control unit 21 starts encryption processing (S333). The encryption processing is the encryption processing in S211 of FIG. 5. The control unit 21 determines whether the encryption processing has failed (S334) and if the encryption processing is determined to have failed (YES in S334), the control unit 21 determines whether offset3 is 100 ms or more (S335). If it is determined that offset3 is less than 100 ms (NO in S335), the control unit 21 adds 10 ms to offset3 (S336) and performs re-authentication in S327 and thereafter. With offset3 being updated, the wait processing for offset3 is performed in the processing in S332. Accordingly, the timing to start the encryption processing (S333) is delayed so that a failure of the encryption processing can be prevented. The control unit 21 limits offset3 to 100 ms, but the upper limit does not necessarily have to be 100 ms.

If it is determined that offset3 is 100 ms or more (YES in S335), encryption processing will fail even if offset3 is prolonged to the upper limit thereof and thus, the control unit 21 performs the processing in S338 and thereafter without storing the timing correction value for the resolution intended in S305. If the first authentication processing is successful, but the encryption processing in S333 fails, the control unit 21 may store Td1, Td2+offset, and offset2 by processing in S337 while eliminating offset3.

Figure 7:
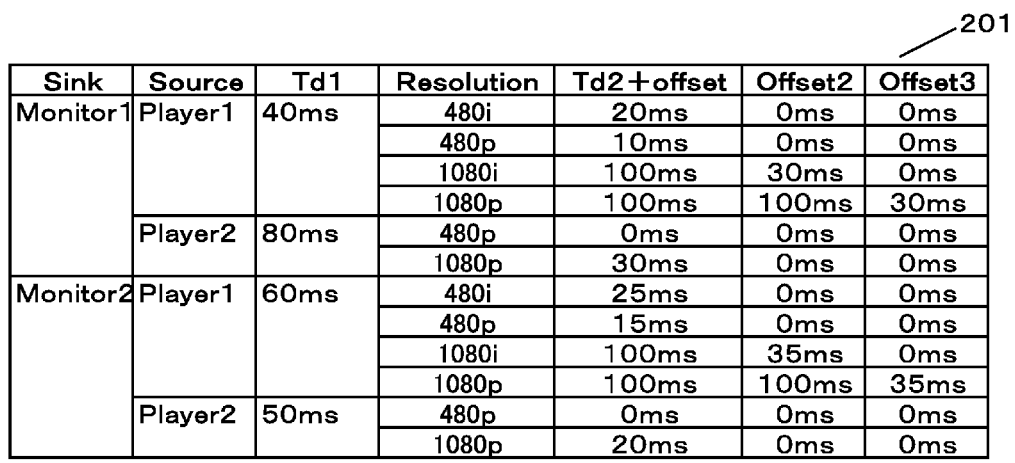
FIG. 7 is a correction value table held by the repeater device.

If the encryption processing is successful (NO in S334), the control unit 21 stores Td1, Td2+offset, offset2, and offset3 set at the time of the processing in S334 in the table 201 of FIG. 7 along with information of the source device 100 selected in S302, the resolution selected in S305, and the selected sink device 300. The table 201 stores Td1 regarding the combination of the product ID of the sink device 300 and the product ID of the source device 100 and further Td2+offset, offset2, and offset3 corresponding to each resolution.

The control unit 21 determines whether the processing in S305 and thereafter has been performed for all resolutions shown in the resolution list (S338) and if it is determined that the processing has been performed (YES in S338), the control unit 21 determines whether the processing in S301 to S338 has been performed for all source devices 100 connected to the repeater 200 (S339). If it is determined that the processing has been performed for all the source devices 100 (YES in S339), the control unit 21 terminates the processing and if it is determined that the source device 100 for which the processing has not been performed (NO in S339), the control unit 21 selects the next source device 100 (S341) to perform the processing in S302 and thereafter. If it is determined that all resolutions have not been checked in the processing in S338 (NO in S338), the control unit 21 increments i (S340) to perform the processing in S305 and thereafter. Though not shown in the flow chart, if a plurality of the sink devices 300 is connected to the repeater 200, in addition to the source devices 100, the control unit 21 also performs the processing in S302 and thereafter for each of the sink devices 300. As a result, as shown in FIG. 7, the control unit 21 can decide corrections values for the plurality of the sink devices 300. The table 201 in FIG. 7 shows that if, for example, the sink device 300 is Monitor1 and the source device 100 is Player1, Td1 is 40 ms and if the resolution is 480i, Td2+offset is 20 ms, offset2 is 0 ms, and offset3 is also 0 ms.

According to the above embodiment, the control unit 21 of the repeater 200 can automatically decide the correction values in HDCP authentication processing regarding the resolution of a TMDS signal and the source device 100 and the sink device 300 connected to the repeater 200. Offset is set to be incremented in units of 10 ms, but the unit of increment may be smaller or larger. The control unit 21 may decide only offset, or only offset2, or only offset3 without deciding all offsets.

Figure 8:
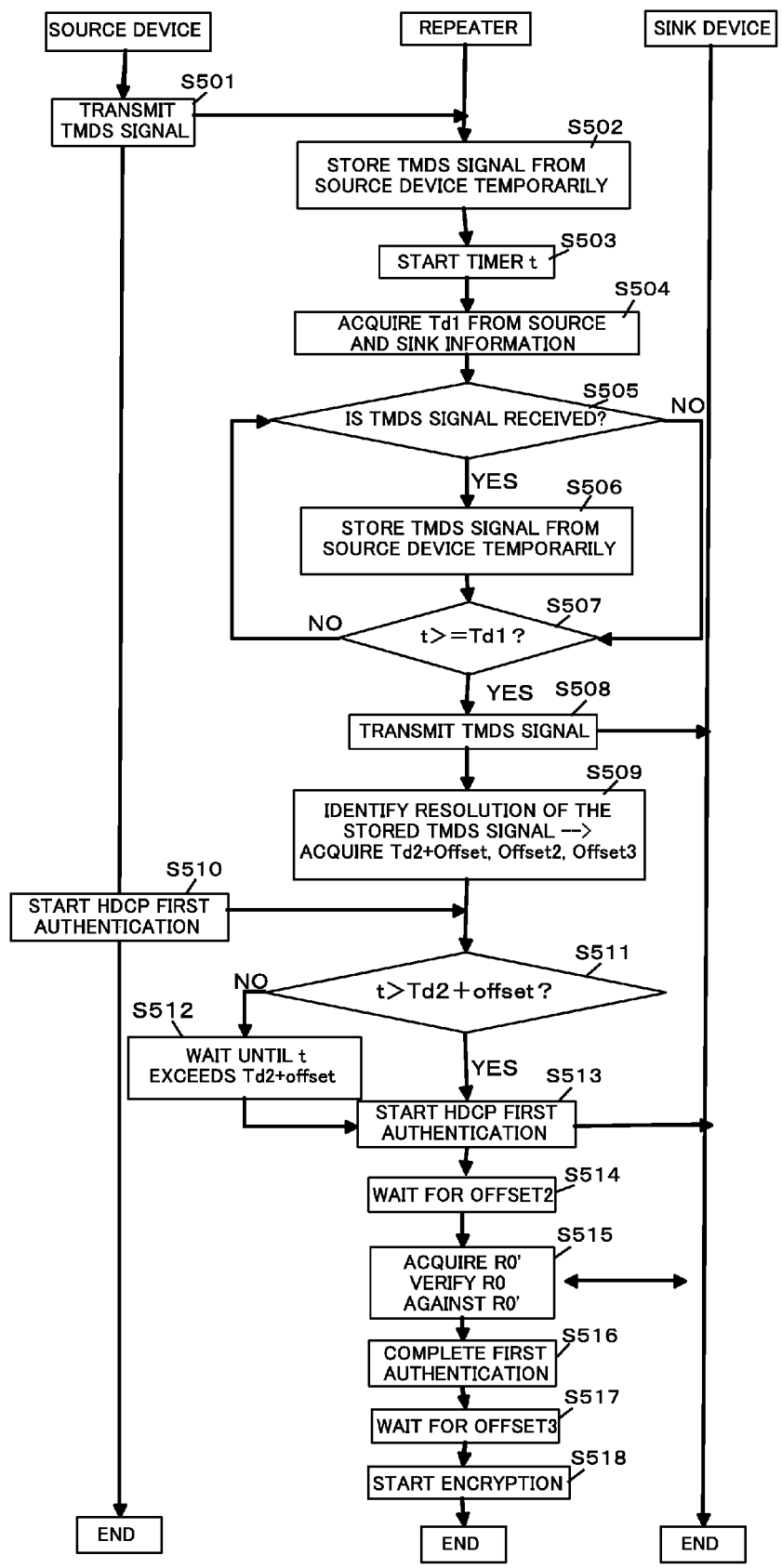
FIG. 8 is a sequence chart among the source device, the repeater, and the sink device.

FIG. 8 is a sequence chart in which the source device 100, the repeater 200, and the sink device 300 perform HDCP authentication processing by using Td1, offset, Td2+offset2, and offset3 decided by the processing of FIGS. 6A and 6B.

The HDMI transmitting unit 14 of the source device 100 transmits a TMDS signal to the repeater 200 (S501). The control unit 21 of the repeater 200 temporarily stores the TMDS signal received by the HDMI receiving unit 23 from the source device 100 in the memory 22 (S502). The control unit 21 of the repeater 200 starts the timer and stores an elapsed time in the variable t (S503). The control unit 21 identifies Td1 from the table in FIG. 7 by using information about the source device 100 and the sink device 300 currently selected by the repeater 200 (S504). If, for example, the source device 100 is Player1 and the sink device 300 is Monitor1, Td1 is 40 ms.

The control unit 21 determines whether the HDMI receiving unit 23 has received any TMDS signal from the source device 100 (S505). If it is determined that a TMDS signal has been received (YES in S505), the control unit 21 temporarily stores the received TMDS signal in the memory 22 (S506). With the processing in S506, data of the TMDS signal stored in S502 is overwritten. If it is determined that no TMDS signal has been received (NO in S505), the control unit 21 performs processing in S507 described below.

The control unit 21 determines whether the current time t is Td1 or more (S507) and if it is determined that t is less than Td1 (NO in S507), the control unit 21 repeats the processing in S505 and thereafter. If the control unit 21 determines that the time t is equal to Td1 or more (YES in S507), the HDMI transmitting unit 24 of the repeater 200 transmits the TMDS signal stored in the memory 22 by the processing in S502 or S506 to the sink device 300 (S508).

Though the HDMI receiving unit 23 of the repeater 200 may receive a plurality of TMDS signals of different resolutions from the source device 100 during the processing in S501 to S507, the HDMI transmitting unit 24 of the repeater 200 transmits the TMDS signal received last after the time of Td1 passes only once in S508 to the sink device 300. As a result, the problem (Problem 1 described above) that unnecessary TMDS signals are transmitted from the repeater 200 to the sink device 300 a plurality of times and thus, the HDMI receiving unit 33 of the sink device 300 cannot normally lock the TMDS signal can be prevented.

The control unit 21 of the repeater 200 identifies the resolution of the TMDS signal stored in the memory 22 and acquires offset, Td2+offset2, and offset3 from the table 201 of FIG. 7 (S509). If, for example, the sink device 300 is Monitor1, the source device 100 is Player1, and the resolution of the TMDS signal is 1080p, Td2+offset is 100 ms, offset2 is 100 ms, and offset3 is 30 ms.

The control unit 11 of the source device 100 transmits an instruction to start the HDCP first authentication to the repeater 200 via the DDC line (S510). The control unit 21 of the repeater 200 determines whether the time t is larger than Td2+offset (S511) and if it is determined that the time t is larger (YES in S511), the control unit 21 transmits an instruction to start the HDCP first authentication to the sink device 300 via the DDC line (S513) and if it is determined that the time t is not larger (NO in S511), the control unit 21 waits until the time t exceeds Td2+offset (S512). Because the control unit 21 of the repeater 200 causes a time delay of Td2+offset between the transmission of the TMDS signal by the processing in S508 and the transmission of an instruction to start the HDCP first authentication to the sink device 300, the above Problem 2 that the control unit 31 of the sink device 300 receives the instruction to start the HDCP first authentication via the DDC line before the HDMI receiving unit 33 of the sink device 300 locks a TMDS signal so that the control unit 31 of the sink device 300 cannot complete the HDCP first authentication normally can be solved.

After transmitting the instruction to start the HDCP first authentication to the sink device 300, the control unit 21 of the repeater 200 waits for the time of offset2 (S514) and acquires R0' from the sink device 300 to perform verification processing of R0 and R0' (S515). The control unit 21 can solve the above Problem 3 by delaying the acquisition time of R0' from the sink device 300 by the time of offset2.

The control unit 21 completes the HDCP first authentication (S516) and waits for the time of offset3 (S517) before starting encryption processing (S518). Because the control unit 21 delays the time to start the encryption processing by the time of offset3, the above Problem 4 can be solved. Hereinafter, each control unit of the source device 100, the repeater 200, and the sink device 300 performs the second authentication and the third authentication.

According to the above embodiment, because the timing of each piece of processing in the HDCP first authentication is delayed based on the correction value decided in FIGS. 6A and 6B, the problem of failed HDCP authentication can be solved. In the HDCP authentication of FIG. 8, the control unit 21 of the repeater 200 applies all of Td1, Td2+offset, offset2, and offset3, but may apply one of Td1, Td2+offset, offset2, and offset3 or any combination thereof.

[Embodiment to Directly Connect the Source Device and the Sink Device]

Figure 9:
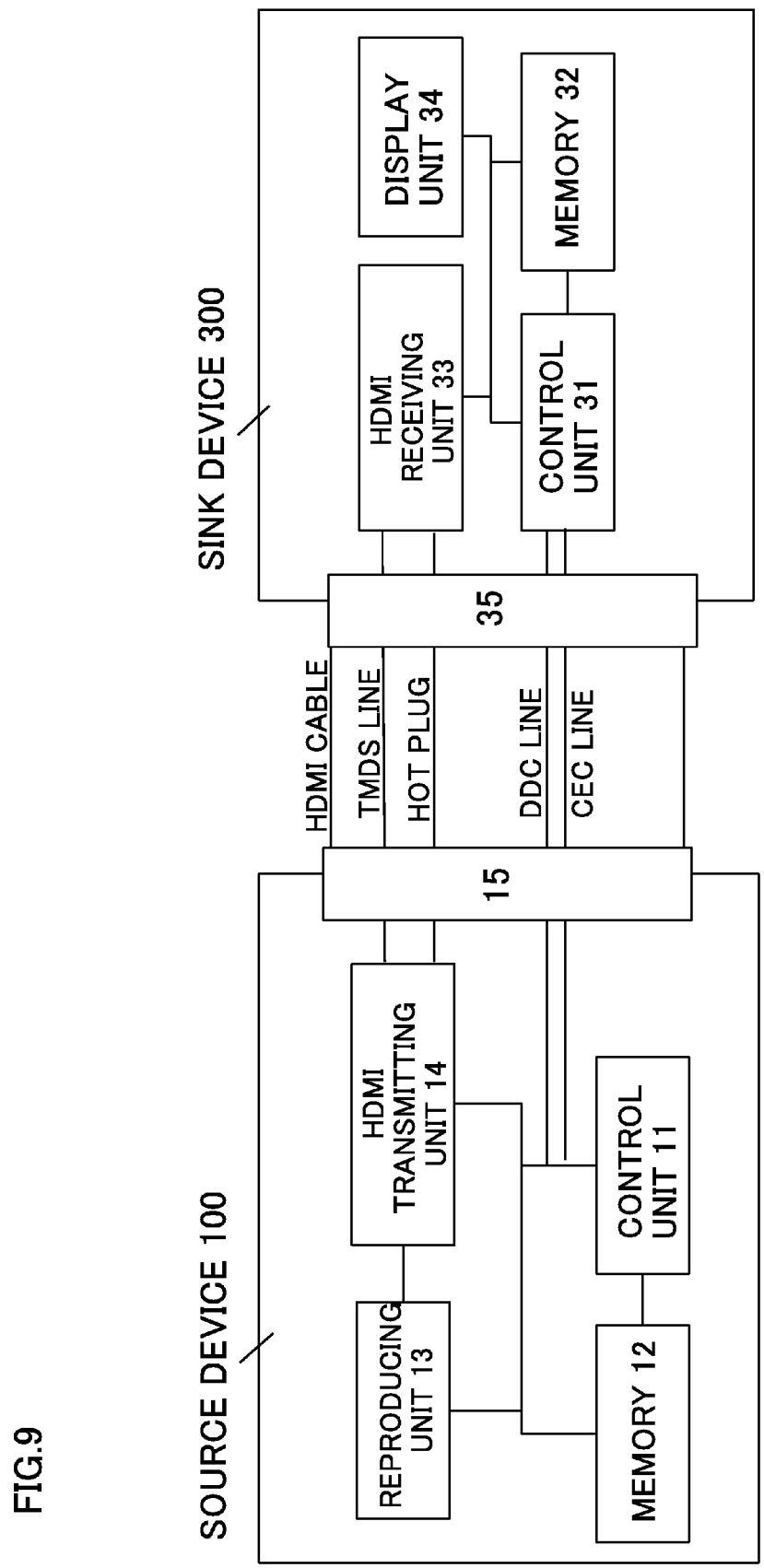
FIG. 9 is a block diagram according to another embodiment of the present invention.

FIG. 9 shows a block diagram of an embodiment in which the source device 100 and the sink device 300 are directly connected without going through the repeater 200. The source device 100 and the sink device 300 are connected via an HDMI cable. In the present embodiment, the source device 100 performs HDCP authentication with the sink device 300.

Figure 10:
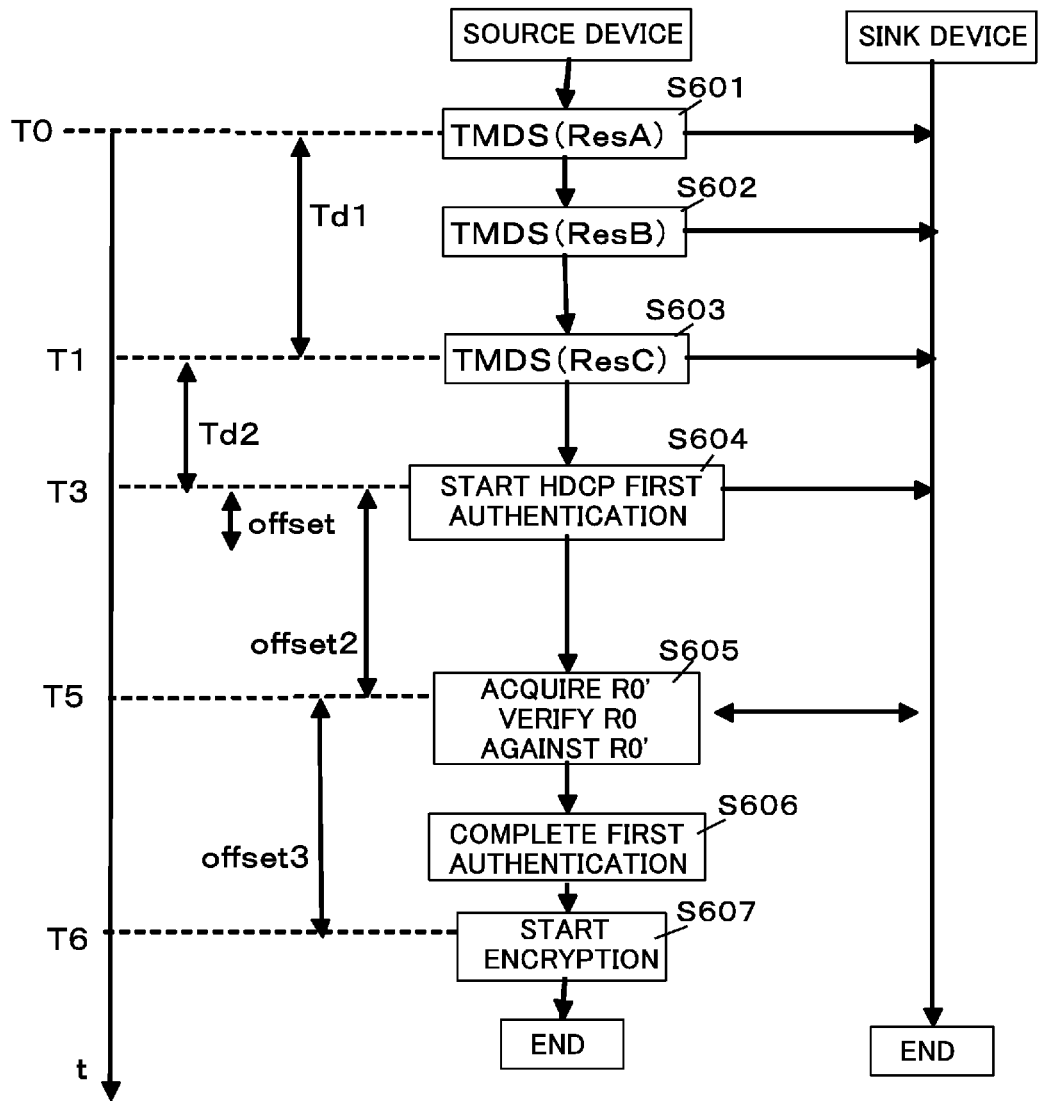
FIG. 10 is a sequence chart between the source device and the sink device.

FIG. 10 shows a sequence chart when the source device 100 and the sink device 300 perform HDCP authentication. Details thereof have been described with reference to FIG. 5 and a brief description thereof is provided here.

The HDMI transmitting unit 14 of the source device 100 successively transmits TMDS signals of different resolutions to the sink device 300 (S601 to S603). Accordingly, the HDMI receiving unit 33 of the sink device 300 may fail to lock a TMDS signal.

The control unit 11 of the source device 100 transmits an instruction to start the HDCP first authentication to the sink device 300 via the DDC line (S604). The control unit 11 acquires R0' from the sink device 300 via the DDC line to verify R0' against R0 of the source device 100 (S605). If the interval between the instruction to start the HDCP first authentication in the processing in S604 and the acquisition processing of R0' in S605 is too short, the control unit 11 may fail in verification processing of R0.

The control unit 11 completes the HDCP first authentication processing (S606) before starting encryption processing (S607). If the interval between the verification processing of R0 and the encryption processing is too short, the control unit 11 may fail in encryption processing. Hereinafter, the control unit 11 of the source device 100 performs the HDCP third authentication with the control unit 31 of the sink device 300. In the present embodiment, the control unit 11 of the source device 100 does not perform the HDCP second authentication.

In the HDCP authentication processing in which the source device 100 and the sink device 300 are directly connected, as described above, the same problems as when connected via the repeater 200 arise.

Figure 11A:
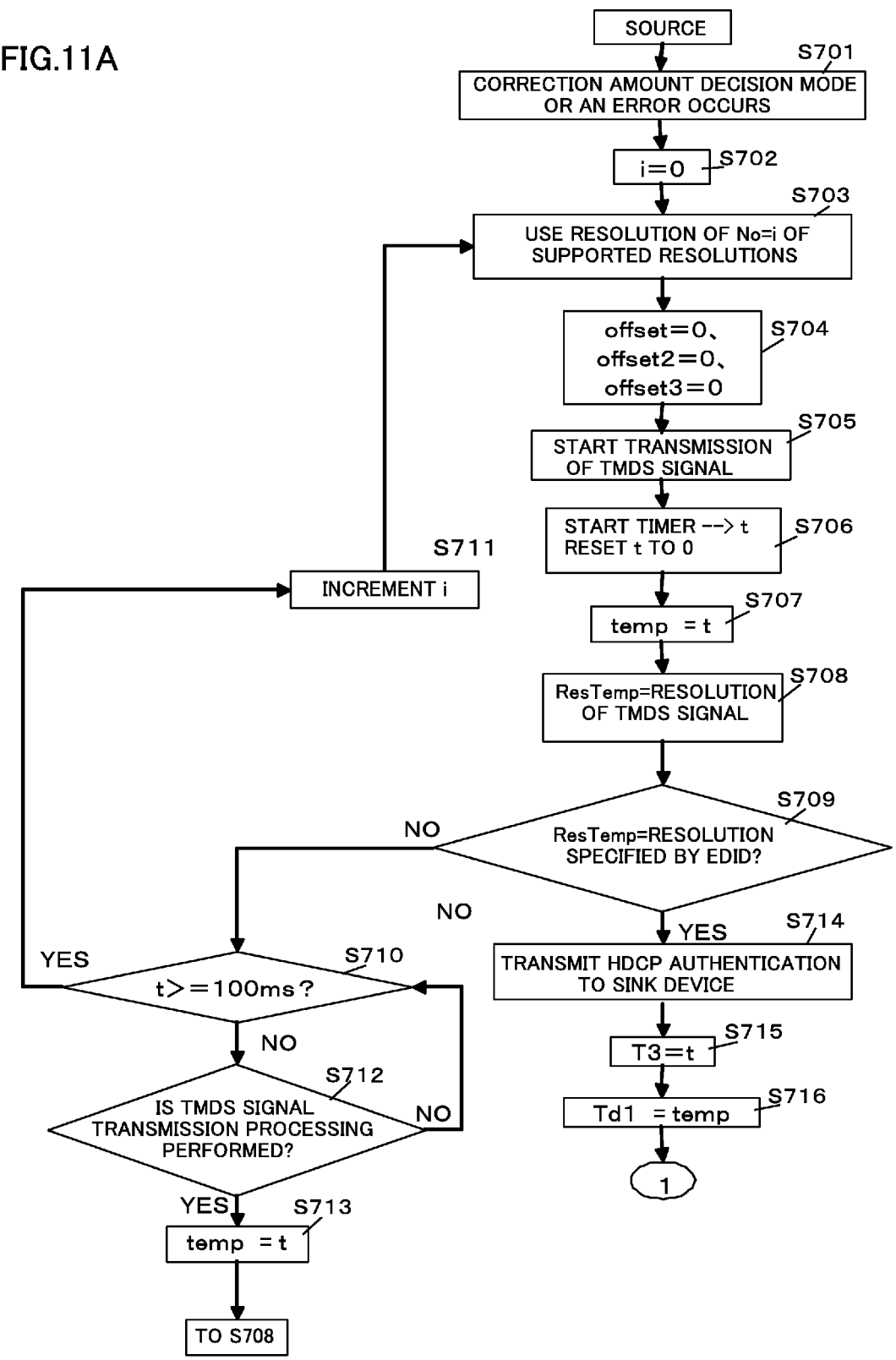
FIG. 11A is a flow chart of the source device.
Figure 11B:
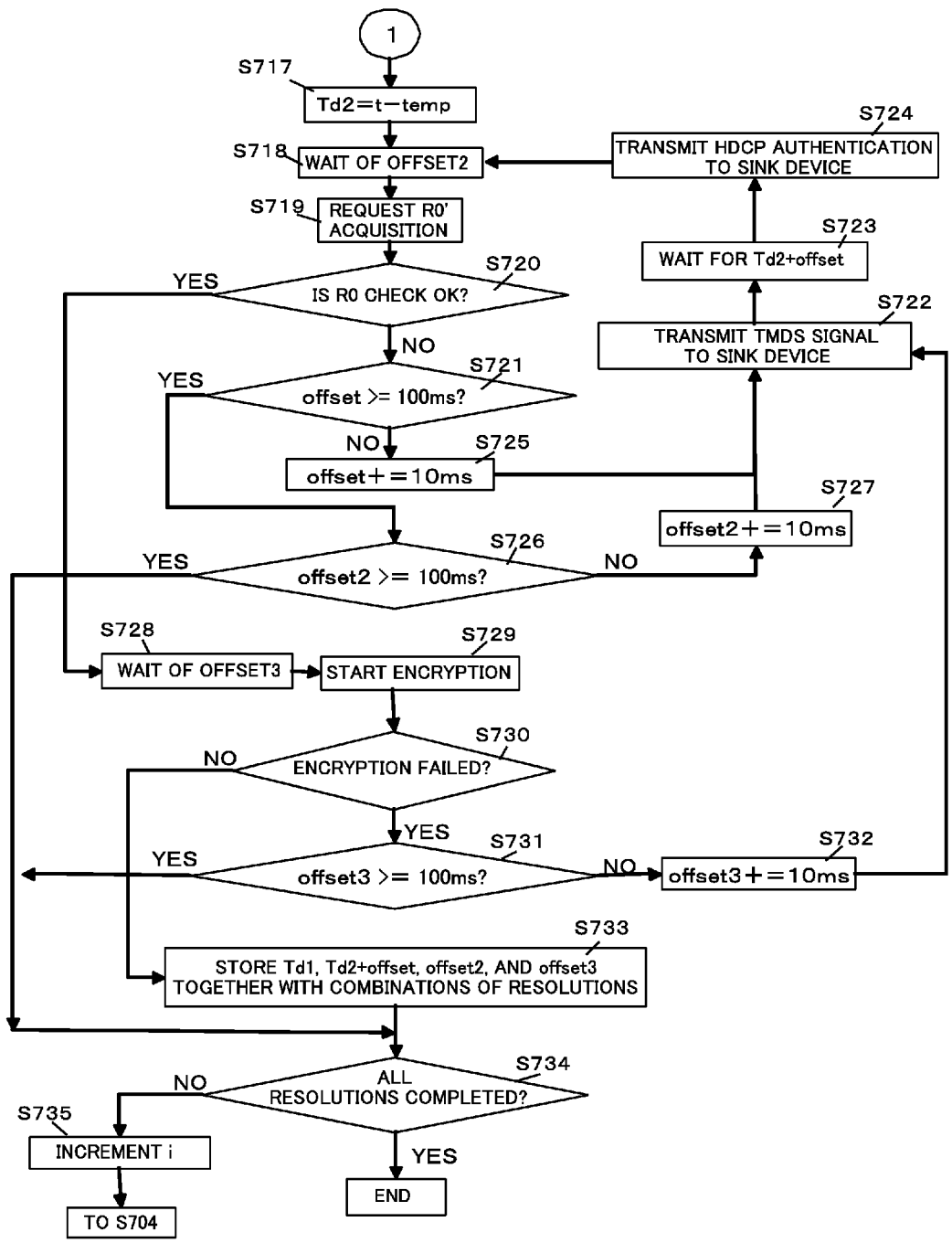
FIG. 11B is a flow chart of the source device.

FIGS. 11A and 11B show flow charts in which the control unit 11 of the source device 100 decides correction values to correct the timing to transmit signals or instructions in HDCP authentication. Details thereof have been described with reference to FIG. 6A and FIG. 6B and a brief description thereof is provided here.

The control unit 11 of the source device 100 has a correction amount decision mode selected by a user's operation or fails in HDCP authentication (S701). The control unit 11 initializes the variable i to 0 (S702).

The control unit 11 selects the resolution specified by the variable i by referring to EDID of the source device 100 (S703).

The control unit 11 initializes offset, offset2, and offset3 to 0 (S704). The HDMI transmitting unit 14 of the source device 100 starts to transmit a TMDS signal to the sink device 300 (S705). The control unit 11 starts the timer and sets an elapsed time to the variable t. The initial value of the variable t is 0.

The control unit 11 sets the current time t to the variable temp. The control unit 11 stores the resolution of the TMDS signal transmitted to the sink device 300 by the processing in S705 in ResTemp (S708) to determine whether ResTemp matches the resolution selected in S703 (S709). While the control unit 11 of the source device 100 decides the resolution of a TMDS signal, the control unit 11 checks whether a TMDS signal of the resolution set by the control unit 11 is generated.

If it is determined that ResTemp does not match the resolution selected in S703 (NO in S709), the control unit 11 determines whether the time t is 100 ms or more. If it is determined that t is 100 ms or more (YES in S710), the control unit 11 increments i (S711) and performs the processing in S703 and thereafter for the next resolution. If it is determined that the time t is less than 100 ms (NO in S710), the control unit 11 determines whether the HDMI transmitting unit 14 has performed processing to transmit a TMDS signal to the sink device 300 (S712) if no TMDS signal transmission processing has been performed (NO in S712), the control unit 11 performs the processing in S710. If it is determined that the HDMI transmitting unit 14 has performed processing to transmit a TMDS signal (YES in S712), the control unit 11 updates the variable temp with the current time t (S713) and performs the processing in S708 and thereafter. Incidentally, the upper limit in S710 may be more than 100 ms or less than 100 ms.

If it is determined that ResTemp matches the resolution selected in S703 (YES in S709), the control unit 11 instructs the sink device 300 to start the HDCP first authentication (S714). The control unit 11 sets the time when the sink device 300 is instructed to start the HDCP first authentication to T3 (S715) and sets Td1 to the value of temp (S716).

The control unit 11 sets the value of t-temp to Td2 (S717 in FIG. 11B) and performs wait processing for the time specified by offset2 (S718). The control unit 11 executes an acquisition request of R0' from the sink device 300 via the DDC line (S719) and determines whether R0 of the source device 100 and R0' of the sink device 300 match (S720) and if it is determined that R0 and R0' do not match (NO in S720), the control unit 11 determines whether offset is 100 ms or more (S721). If it is determined that offset is less than 100 ms (NO in S721), the control unit 11 adds 10 ms to offset (S725) and the HDMI transmitting unit 14 of the source device 100 transmits a TMDS signal to the sink device 300 (S722). The control unit 11 waits for the time of Td2+offset (S723) and transmits an instruction to start the HDCP first authentication to the sink device 300 again (S724) to perform the processing in S718 and thereafter.

If it is determined that offset is 100 ms or more (YES in S721), the control unit 11 determines whether offset2 is 100 ms or more (S726) and if it is determined that offset2 is 100 ms or more (YES in S726), the control unit 11 performs the processing in S734 and thereafter. If it is determined that offset2 is less than 100 ms (NO in S726), the control unit 11 adds 10 ms to offset2 (S727) and performs the processing of re-authentication in S722 and thereafter.

If it is determined that the verification processing of R0 is successful (YES in S720), the control unit 11 waits for the time of offset3 (S728) before starting encryption processing (S729). The control unit 11 determines whether the encryption processing has failed (S730) and if the encryption processing is determined to have failed (YES in S730), the control unit 11 determines whether offset3 is 100 ms or more (S731). If it is determined that offset3 is less than 100 ms (NO in S731), the control unit 11 adds 10 ms to offset3 (S732) and performs the processing of re-authentication in S722 and thereafter.

If it is determined that offset3 is 100 ms or more (YES in S731), the control unit 11 performs the processing in S734 and thereafter. If it is determined that the encryption processing is successful (NO in S730), the control unit 11 stores the current Td1, Td2+offset, offset2, and offset3 in the table 201 together with the sink device 300 and the resolution.

The control unit 11 determines whether the processing in S701 to S733 has been performed for all resolutions of the resolution list of EDID thereof (S734) and if it is determined that the processing has been performed (YES in S734), the control unit 11 terminates the processing and if it is determined that the processing has not been performed (NO in S734), the control unit 11 increments i (S735) to continue the processing in S704 and thereafter.

Figure 12:
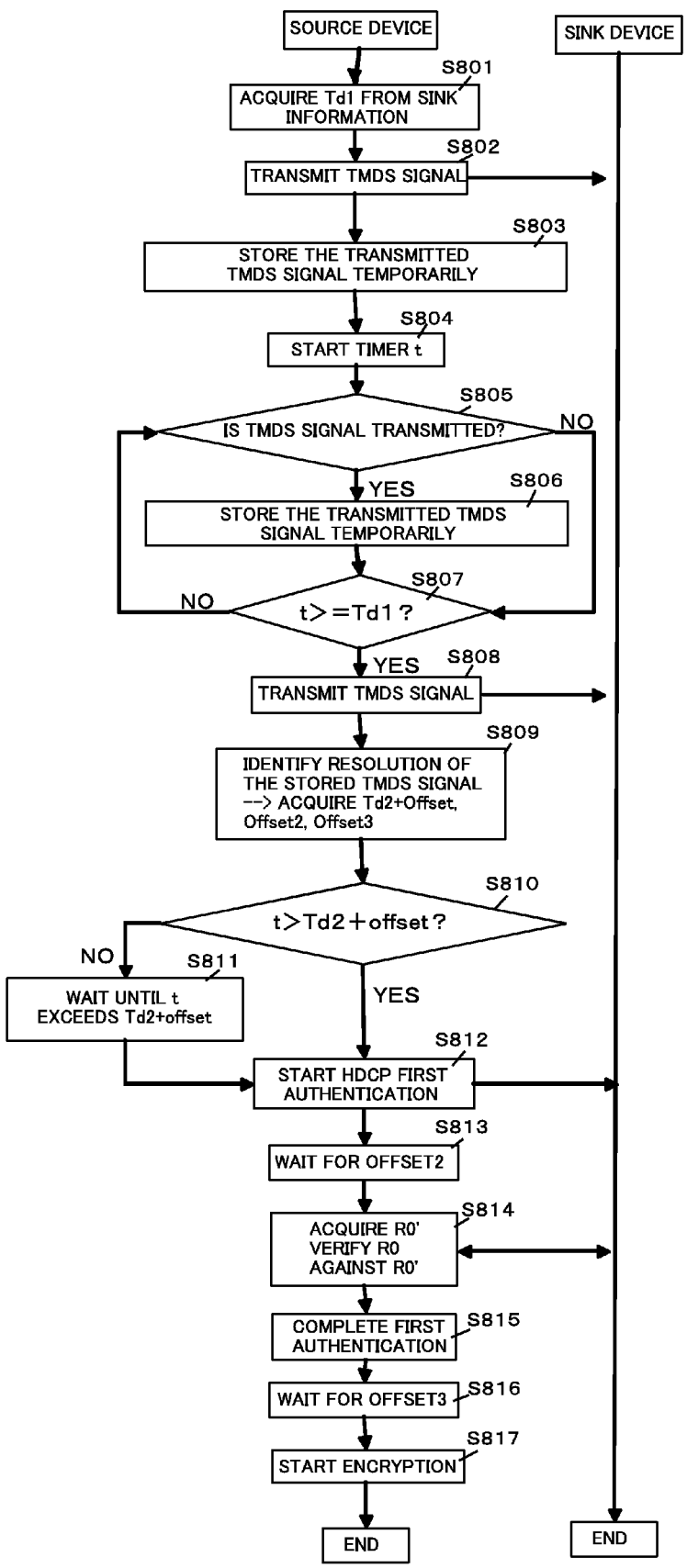
FIG. 12 is a sequence chart between the source device and the sink device.

FIG. 12 shows a sequence chart between the source device 100 and the sink device 300 that perform HDCP authentication processing by using correction values decided by the processing in FIGS. 11A and 11B. Details thereof have been described with reference to FIG. 8 and a brief description thereof is provided here.

The control unit 11 of the source device 100 acquires Td1 from the table 201 based on information about the currently connected sink device 300 (S801). In the table 201 according to the present embodiment, the source device 100 is fixed and the number of the sink devices 300 is normally 1.

The HDMI transmitting unit 14 of the source device 100 starts to transmit a TMDS signal to the sink device 300 (S802). The control unit 11 of the source device 100 temporarily stores the TMDS signal transmitted by the HDMI transmitting unit 14 to the sink device 300 as the first TMDS signal in the memory 12 (S803), starts the timer, and sets an elapsed time to the variable t (S804).

Because the HDMI transmitting unit 14 of the source device 100 may transmit a plurality of TMDS signals to the sink device 300, the control unit 11 determines whether any TMDS signal has been transmitted to the sink device 300 (S805) and if it is determined that the HDMI transmitting unit 14 has newly transmitted a TMDS signal to the sink device 300 (YES in S805), the control unit 11 temporarily stores the transmitted TMDS signal in the memory 12. The control unit 11 deletes the TMDS signal stored in S803.

If it is determined that the HDMI transmitting unit 14 has transmitted no TMDS signal (NO in S805), the control unit 11 determines whether the time t is Td1 or more (S807) and if it is determined that the time t is less than Td1 (NO in S807), the control unit 11 repeats the processing in S805 and thereafter. If it is determined that t is Td1 or more (YES in S807), the control unit 11 causes the HDMI transmitting unit 14 to transmit the TMDS signal stored in the memory 12 to the sink device 300 (S808).

The control unit 11 identifies the resolution of the TMDS signal stored in the memory 12 and acquires the corresponding Td2+offset, offset2, and offset3 from the table 201 (S809).

The control unit 11 determines whether the time t is larger than Td2+offset (S810) and if it is determined that the time t is equal to or less than Td2+offset (NO in S810), the control unit 11 waits until the time t exceeds Td2+offset (S811). If it is determined that t is larger than Td2+offset (YES in S810), the control unit 11 transmits an instruction to start the HDCP first authentication to the sink device 300 via the DDC line (S812).

The control unit 11 performs wait processing for the time of offset2 (S813). The control unit 11 requests R0' from the sink device 300 via the DDC line and verifies R0, which is the session key of the control unit 11, against the session key R0' of the sink device 300 (S814) before terminating the HDCP first authentication processing (S815). Further, the control unit 11 performs wait processing for the time of offset3 (S816) before starting encryption processing (S817). Hereinafter, the control unit 11 performs the HDCP third authentication processing.

According to the second embodiment described above, the control unit 11 of the source device 100 corrects the timing of HDCP authentication based on correction values in the HDCP authentication in which the source device 100 and the sink device 300 are directly connected and thus, the HDCP authentication can be prevented from failing.

What is claimed is:

1. A relay apparatus connectable to a transmitting apparatus that transmits video and audio signals and a receiving apparatus that receives the video and audio signals, comprising:
   an authentication video signal receiving unit configured to receive an authentication start video signal from the transmitting apparatus;
   a correction value decision unit configured to decide a correction value to correct timing for the relay apparatus to transmit the authentication start video signal or an authentication request to the receiving apparatus by determining whether authentication processing is successful while changing the correction value;
a correction unit configured to correct the timing to transmit the authentication start video signal or the authentication request to the receiving apparatus based on the correction value;
a start time storage unit configured to store a start time, which is a time when the authentication start video signal is received from the transmitting apparatus for the first time;
an authentication video signal transmitting unit configured to transmit the authentication start video signal to the receiving apparatus;
an authentication instruction receiving unit configured to receive an authentication start instruction transmitted from the transmitting apparatus; and
a unit configured to store the received authentication start video signal when the authentication start video signal is received by the relay apparatus from the transmitting apparatus, wherein
the correction value decision unit includes
a latest time storage unit configured to store a time when the authentication start video signal is received as a latest time if the authentication start video signal is received from the transmitting apparatus before the authentication start instruction is received by the relay apparatus from the transmitting apparatus and
a unit configured to store a difference between the latest time and the start time as a third correction time when the authentication start instruction is received by the relay apparatus from the transmitting apparatus, and
the correction unit compares the third correction time decided by the correction value decision unit and an elapsed time from the start time and if the elapsed time is determined to be longer than the third correction time, the authentication video signal transmitting unit transmits the stored authentication start video signal to the receiving apparatus.

2. A computer program stored on a non-transitory computer readable medium causing a computer of the relay apparatus according to claim 1 to execute each unit of the relay apparatus.

3. A relay apparatus connectable to a transmitting apparatus that transmits video and audio signals and a receiving apparatus that receives the video and audio signals, comprising:
an authentication video signal receiving unit configured to receive an authentication start video signal from the transmitting apparatus;
a correction value decision unit configured to decide a correction value to correct timing for the relay apparatus to transmit the authentication start video signal or an authentication request to the receiving apparatus by determining whether authentication processing is successful while changing the correction value;
a correction unit configured to correct the timing to transmit the authentication start video signal or the authentication request to the receiving apparatus based on the correction value;
a select apparatus decision unit configured to decide the receiving apparatus and the transmitting apparatus selected in the relay apparatus;
a resolution acquisition unit configured to acquire a resolution of the authentication start video signal;
a correction value decision unit for each resolution configured to perform processing to decide the correction value for each of the resolutions recorded in a resolution list; and
a unit configured to perform processing to determine whether the authentication processing is successful while changing the correction value for a combination of one or a plurality of the receiving apparatuses and the transmitting apparatuses connected to the relay apparatus, wherein
the correction value is decided based on the resolution acquired by the resolution acquisition unit, information about the receiving apparatus selected in the relay apparatus, and
information about the transmitting apparatus selected in the relay apparatus and timing to transmit the authentication start video signal or the authentication request to the receiving apparatus is corrected based on the correction value.

4. A computer program stored on a non-transitory computer readable medium causing a computer of the relay apparatus according to claim 3 to execute each unit of the relay apparatus.

5. A method of a relay apparatus connectable to a transmitting apparatus that transmits video and audio signals and a receiving apparatus that receives the video and audio signals, comprising:
an authentication video signal receiving step to receive an authentication start video signal from the transmitting apparatus;
a correction value decision step to decide a correction value to correct timing for the relay apparatus to transmit the authentication start video signal or an authentication request to the receiving apparatus by determining whether authentication processing is successful while changing the correction value;
a correction step to correct the timing to transmit the authentication start video signal or the authentication request to the receiving apparatus based on the correction value;
a start time storage step to store a start time, which is a time when the authentication start video signal is received from the transmitting apparatus for the first time;
an authentication video signal transmitting step to transmit the authentication start video signal to the receiving apparatus;
an authentication instruction receiving step to receive an authentication start instruction transmitted from the transmitting apparatus; and
a step to store the received authentication start video signal when the authentication start video signal is received by the relay apparatus from the transmitting apparatus, wherein
the correction value decision step includes
a latest time storage step to store a time when the authentication start video signal is received as a latest time if the authentication start video signal is received from the transmitting apparatus before the authentication start instruction is received by the relay apparatus from the transmitting apparatus and
a step to store a difference between the latest time and the start time as a third correction time when the authentication start instruction is received by the relay apparatus from the transmitting apparatus, and
the correction step compares the third correction time decided by the correction value decision step and an elapsed time from the start time and if the elapsed time is determined to be longer than the third correction time, the authentication video signal transmitting step transmits the stored authentication start video signal to the receiving apparatus.

6. A method of a relay apparatus connectable to a transmitting apparatus that transmits video and audio signals and a receiving apparatus that receives the video and audio signals, comprising:

an authentication video signal receiving step to receive an authentication start video signal from the transmitting apparatus;

a correction value decision step to decide a correction value to correct timing for the relay apparatus to transmit the authentication start video signal or an authentication request to the receiving apparatus by determining whether authentication processing is successful while changing the correction value;

a correction step to correct the timing to transmit the authentication start video signal or the authentication request to the receiving apparatus based on the correction value;

a select apparatus decision step to decide the receiving apparatus and the transmitting apparatus selected in the relay apparatus;

a resolution acquisition step to acquire a resolution of the authentication start video signal;

a correction value decision step for each resolution to perform processing to decide the correction value for each of the resolutions recorded in a resolution list; and a step to perform processing to determine whether the authentication processing is successful while changing the correction value for a combination of one or a plurality of the receiving apparatuses and the transmitting apparatuses connected to the relay apparatus, wherein the correction value is decided based on the resolution acquired by the resolution acquisition step, information about the receiving apparatus selected in the relay apparatus, and information about the transmitting apparatus selected in the relay apparatus and timing to transmit the authentication start video signal or the authentication request to the receiving apparatus is corrected based on the correction value.

\* \* \* \* \*